US010002164B2

(12) United States Patent
Jarvis et al.

(10) Patent No.: US 10,002,164 B2
(45) Date of Patent: Jun. 19, 2018

(54) SYSTEMS AND METHODS FOR CONTEXT BASED SEARCH OF SIMULATION OBJECTS

(71) Applicant: Ansys, Inc., Canonsburg, PA (US)

(72) Inventors: Glyn Jarvis, Surrey (GB); Tom Shadle, Scenery Hill, PA (US)

(73) Assignee: Ansys, Inc., Canonsburg, PA (US)

( * ) Notice: Subject to any disclaimer, the term of this patent is extended or adjusted under 35 U.S.C. 154(b) by 182 days.

(21) Appl. No.: 14/250,788

(22) Filed: Apr. 11, 2014

(65) Prior Publication Data

US 2014/0297624 A1 Oct. 2, 2014

Related U.S. Application Data

(63) Continuation-in-part of application No. 13/907,564, filed on May 31, 2013, now abandoned.
(Continued)

(51) Int. Cl.
*G06F 3/0482* (2013.01)
*G06F 17/30* (2006.01)
*G06F 17/50* (2006.01)

(52) U.S. Cl.
CPC ...... *G06F 17/30528* (2013.01); *G06F 3/0482* (2013.01); *G06F 17/50* (2013.01); *G06F 17/5009* (2013.01); *G06F 2217/04* (2013.01)

(58) Field of Classification Search
CPC .................................................. G06F 3/0482
(Continued)

(56) References Cited

U.S. PATENT DOCUMENTS 5,293,479 A * 3/1994 Quintero ............. A61M 1/3621
  703/1
5,408,638 A * 4/1995 Sagawa ............... G06F 17/5018
  703/2
(Continued)

FOREIGN PATENT DOCUMENTS

EP 1145116 B1 10/2002

OTHER PUBLICATIONS

International Search Report and Written Opinion dated Nov. 28, 2014 from related/corresponding PCT Patent Application Serial No. PCT/US2014/48041, filed Jul. 24, 2014.
(Continued)

*Primary Examiner* — Reza Nabi
*Assistant Examiner* — Daniel Rodriguez
(74) *Attorney, Agent, or Firm* — Jones Day

(57) ABSTRACT

Systems and methods are provided for providing a context-based search of simulation objects. A computer-readable medium configured for storage of objects and records associated with the objects is accessed, where the objects include a plurality of simulation objects and one or more container objects, where a container object is associated with a context of the engineering simulation, where a record associated its associated container record identifies one or more simulation objects that are associated with the container object. A graphical user interface is provided for display. The graphical user interface includes a first control for identifying a context of the simulation for search and a second control for identifying an object parameter for search. A container object is identified based on the identified context. Object parameters of the simulation objects associated with the identified container object are searched using the identified object parameter to identify matching simulation objects.

26 Claims, 23 Drawing Sheets

Related U.S. Application Data

(60) Provisional application No. 61/858,357, filed on Jul. 25, 2013, provisional application No. 61/858,815, filed on Jul. 26, 2013, provisional application No. 61/654,576, filed on Jun. 1, 2012, provisional application No. 61/654,661, filed on Jun. 1, 2012.

(58) Field of Classification Search
USPC .......................................................... 715/770
See application file for complete search history.

(56) References Cited

U.S. PATENT DOCUMENTS

| | | | | |
|---|---|---|---|---|
| 5,566,295 A * | 10/1996 | Cypher | G06F 8/34 | 703/13 |
| 5,812,130 A * | 9/1998 | Van Huben | G06Q 10/10 | 399/81 |
| 6,051,029 A * | 4/2000 | Paterson | G06F 8/34 | 703/22 |
| 6,591,278 B1 * | 7/2003 | Ernst | G06F 17/30557 | |
| 6,629,093 B1 * | 9/2003 | Davis | G06F 17/50 | 700/182 |
| 6,647,305 B1 * | 11/2003 | Bigelow | G06F 17/50 | 700/182 |
| 6,721,696 B1 * | 4/2004 | Askins | G06F 17/5009 | 703/22 |
| 6,774,911 B2 * | 8/2004 | Hodgson | G06Q 10/10 | 345/619 |
| 6,782,305 B2 * | 8/2004 | Liteplo | G06F 17/50 | 700/105 |
| 7,013,028 B2 * | 3/2006 | Gont | G06F 17/5045 | 382/113 |
| 7,599,822 B2 * | 10/2009 | Hearn | G06F 19/702 | 703/12 |
| 7,818,275 B2 * | 10/2010 | Bertrand | G06N 5/042 | 434/118 |
| 8,117,558 B2 * | 2/2012 | Hoguet | G06Q 30/0601 | 382/282 |
| 8,122,370 B2 * | 2/2012 | Hoguet | G06Q 30/00 | 382/282 |
| 8,150,859 B2 * | 4/2012 | Vadlamani | G06F 17/30707 | 707/748 |
| 8,260,581 B2 * | 9/2012 | Hoguet | G06F 17/5004 | 703/1 |
| 8,498,983 B1 * | 7/2013 | Zhang | G06F 17/30687 | 706/12 |
| 8,543,362 B2 * | 9/2013 | Germann | G06F 17/5009 | 703/6 |
| 8,788,574 B2 * | 7/2014 | Beckman | G06F 17/30516 | 345/418 |
| 9,075,931 B2 * | 7/2015 | Charles | G06F 17/50 | |
| 9,098,650 B2 * | 8/2015 | Baudisch | G06F 17/5009 | |
| 2003/0005090 A1 * | 1/2003 | Sullivan, Jr. | H04L 41/0816 | 709/220 |
| 2003/0158855 A1 * | 8/2003 | Farnham | G06F 3/0481 | |
| 2004/0068419 A1 * | 4/2004 | Salwitz | G06Q 10/06312 | 705/7.22 |
| 2004/0153437 A1 * | 8/2004 | Buchan | G06Q 10/06 | |
| 2004/0225682 A1 * | 11/2004 | Murman | G06Q 10/06 | |
| 2004/0243254 A1 * | 12/2004 | Gould | G06F 17/30126 | 700/1 |
| 2004/0243483 A1 * | 12/2004 | Baumann | G06Q 30/06 | 705/26.1 |
| 2004/0249809 A1 * | 12/2004 | Ramani | G06F 17/30259 | |
| 2005/0022152 A1 * | 1/2005 | Turk | G06F 17/5018 | 717/100 |
| 2005/0160080 A1 * | 7/2005 | Dawson | G06F 17/30699 | |
| 2005/0267731 A1 * | 12/2005 | Hatcherson | G06F 9/54 | 703/26 |
| 2006/0036568 A1 * | 2/2006 | Moore | G06F 17/30126 | |
| 2006/0136842 A1 * | 6/2006 | Charles | G06F 17/30557 | 715/825 |
| 2006/0179035 A1 * | 8/2006 | Broker | G06F 17/30973 | |
| 2006/0218500 A1 | 9/2006 | Sauve et al. | | |
| 2006/0265664 A1 * | 11/2006 | Simons | A62B 99/00 | 715/772 |
| 2007/0070064 A1 * | 3/2007 | Nasu | G06T 19/00 | 345/419 |
| 2007/0150365 A1 * | 6/2007 | Bolivar | G06Q 30/02 | 705/26.61 |
| 2007/0174281 A1 * | 7/2007 | Chase | H04N 7/17318 | |
| 2008/0097975 A1 * | 4/2008 | Guay | G06F 17/30265 | |
| 2008/0216012 A1 * | 9/2008 | Leslie | G06Q 10/109 | 715/792 |
| 2008/0269942 A1 * | 10/2008 | Free | G06F 17/50 | 700/182 |
| 2009/0049424 A1 * | 2/2009 | Kumar | G06F 8/34 | 717/109 |
| 2009/0182786 A1 * | 7/2009 | Haanpaa | G06F 17/30979 | |
| 2009/0254316 A1 * | 10/2009 | Tillman | G06F 17/5009 | 703/2 |
| 2009/0319892 A1 * | 12/2009 | Wright | G06F 3/011 | 715/701 |
| 2010/0013833 A1 * | 1/2010 | Gandikota | G06F 17/50 | 345/420 |
| 2010/0017371 A1 * | 1/2010 | Whalin | G06Q 10/06 | 707/E17.014 |
| 2010/0031185 A1 | 2/2010 | Wilson et al. | | |
| 2010/0064296 A1 * | 3/2010 | Bertram | G06F 9/45512 | 719/315 |
| 2010/0138762 A1 * | 6/2010 | Reghetti | G06T 19/20 | 715/765 |
| 2010/0156936 A1 * | 6/2010 | Maeda | G06F 17/30259 | 345/647 |
| 2010/0274535 A1 * | 10/2010 | McDaniel | G06F 17/5009 | 703/1 |
| 2010/0292970 A1 * | 11/2010 | Brincat | G06F 17/5009 | 703/6 |
| 2011/0040657 A1 * | 2/2011 | Roswell | G06F 17/3089 | 705/27.1 |
| 2011/0214091 A1 * | 9/2011 | Nicol | G06F 3/0482 | 715/838 |
| 2012/0123764 A1 * | 5/2012 | Ito | G06F 9/5055 | 703/21 |
| 2012/0130914 A1 * | 5/2012 | Kinghorn | G06Q 10/101 | 705/317 |
| 2012/0233228 A1 * | 9/2012 | Barton | H04L 67/06 | 707/827 |
| 2013/0066601 A1 * | 3/2013 | Palanivel | G06F 17/50 | 703/1 |
| 2013/0073570 A1 * | 3/2013 | Joshi | G06F 17/30572 | 707/754 |
| 2013/0132875 A1 * | 5/2013 | Allen | G06F 8/34 | 715/765 |
| 2013/0326388 A1 * | 12/2013 | Shi | G06F 3/04815 | 715/772 |
| 2014/0129181 A1 * | 5/2014 | Weatherhead | G06F 17/50 | 703/1 |
| 2014/0130012 A1 * | 5/2014 | Weatherhead | G06F 8/24 | 717/120 |
| 2014/0180654 A1 * | 6/2014 | Seymour | G06F 17/5018 | 703/2 |
| 2014/0222387 A1 * | 8/2014 | Cannon | G06F 17/5018 | 703/1 |
| 2014/0229212 A1 * | 8/2014 | MacElheron | G06Q 10/06 | 705/7.15 |
| 2014/0278269 A1 * | 9/2014 | Winn | G06F 17/50 | 703/1 |
| 2014/0324904 A1 * | 10/2014 | Yamamoto | G06F 17/50 | 707/769 |
| 2014/0379309 A1 * | 12/2014 | Banta | G06F 17/50 | 703/1 |
| 2015/0007121 A1 * | 1/2015 | Lin | G06F 17/5068 | 716/112 |

(56) References Cited

U.S. PATENT DOCUMENTS

2015/0072316 A1* 3/2015 Hatcherson ............ G09B 9/301
                                                434/30
2015/0186457 A1* 7/2015 Enomoto ................ G06F 17/50
                                                707/769

OTHER PUBLICATIONS

Notification Concerning Transmittal of International Preliminary Report on Patentability, dated Feb. 4, 2016 issued in related PCT/US2014/048041.
Extended Search Report dated Apr. 20, 2016 from related/corresponding European Patent Application Serial No. 13797834.2.

* cited by examiner

Fig. 21

SYSTEMS AND METHODS FOR CONTEXT BASED SEARCH OF SIMULATION OBJECTS

CROSS-REFERENCE TO RELATED APPLICATIONS

The present application claims priority from U.S. Provisional Application Ser. No. 61/858,357, filed Jul. 25, 2013, and U.S. Provisional Application Ser. No. 61/858,815, filed Jul. 26, 2013, the entirety of both of which is hereby incorporated by reference.

This application is a continuation in part of U.S. patent application Ser. No. 13/907,564, filed May 31, 2013, which claims priority to U.S. Provisional Application Ser. No. 61/654,576, filed Jun. 1, 2012, and U.S. Provisional Application Ser. No. 61/654,661, filed Jun. 1, 2012, the entirety of each of which is herein incorporated by reference.

FIELD

This disclosure is related generally to engineering simulation and more particularly to simulation object searching.

BACKGROUND

Engineering simulation enables the imitation of a real-world process, often in accelerated time, using a computer-implemented model that represents key characteristics or functions of the physical system being simulated. Such characteristics or functions of the physical system can be represented by simulation objects. Simulation of complex systems enables observations of interactions among large numbers of components, where such interactions may not be self-evident. While such complex system simulations can offer significant insight into system function, the number of system characteristics and functions, each represented by a simulation object, can become arbitrarily large, such that location of specific simulation objects (e.g., a simulation object that stores a desired simulation result) becomes difficult.

SUMMARY

Systems and methods are provided for providing a context-based search of simulation objects associated with an engineering simulation. In a method, a computer-readable medium configured for storage of objects and records associated with the objects is accessed, where the objects include a plurality of simulation objects, where a record associated with a simulation object includes a object parameter associated with the simulation object; and one or more container objects, where a container object is associated with a context of the engineering simulation, where a record associated its associated container record identifies one or more simulation objects that are associated with the container object. A graphical user interface is provided for display on a device and for selecting one or more filters to be applied to the simulation objects. The graphical user interface includes a first control for identifying a context of the simulation for search and a second control for identifying an object parameter for search. A container object is identified based on the identified context. Object parameters of the simulation objects associated with the identified container object are searched using the identified object parameter to identify matching simulation objects. Any matching simulation objects are provided on the graphical user interface for display.

As another example, a computer-implemented system for providing a context-based search of simulation objects associated with an engineering simulation includes a computer-readable medium configured for storage of objects and records associated with the objects. The objects include a plurality of simulation objects, where a record associated with a simulation object includes a object parameter associated with the simulation object; and one or more container objects, where a container object is associated with a context of the engineering simulation, and where a record associated with its associated container record identifies one or more simulation objects that are associated with the container object. A graphical user interface is configured for display on a device and for selecting one or more filters to be applied to the simulation objects, where the graphical user interface includes a first control for identifying a context of the simulation for searching and a second control for identifying an object parameter for searching. One or more data processors are configured to identify a container object based on the identified context and search object parameters of the simulation objects associated with the identified container object using the identified object parameter to identify matching simulation objects, where any matching simulation objects are provided for display on the graphical user interface.

As a further example, a computer-readable medium is encoded with instructions for commanding one or more data processors to execute steps for providing a context-based search of simulation objects associated with an engineering simulation. In the steps, a computer-readable medium configured for storage of objects and records associated with the objects is accessed, where the objects include a plurality of simulation objects, where a record associated with a simulation object includes a object parameter associated with the simulation object; and one or more container objects, where a container object is associated with a context of the engineering simulation, where a record associated its associated container record identifies one or more simulation objects that are associated with the container object. A graphical user interface is provided for display on a device and for selecting one or more filters to be applied to the simulation objects. The graphical user interface includes a first control for identifying a context of the simulation for search and a second control for identifying an object parameter for search. A container object is identified based on the identified context. Object parameters of the simulation objects associated with the identified container object are searched using the identified object parameter to identify matching simulation objects. Any matching simulation objects are provided on the graphical user interface for display.

BRIEF DESCRIPTION OF THE DRAWINGS

FIG. 21 depicts a text based search control.

DETAILED DESCRIPTION

Figure 1:
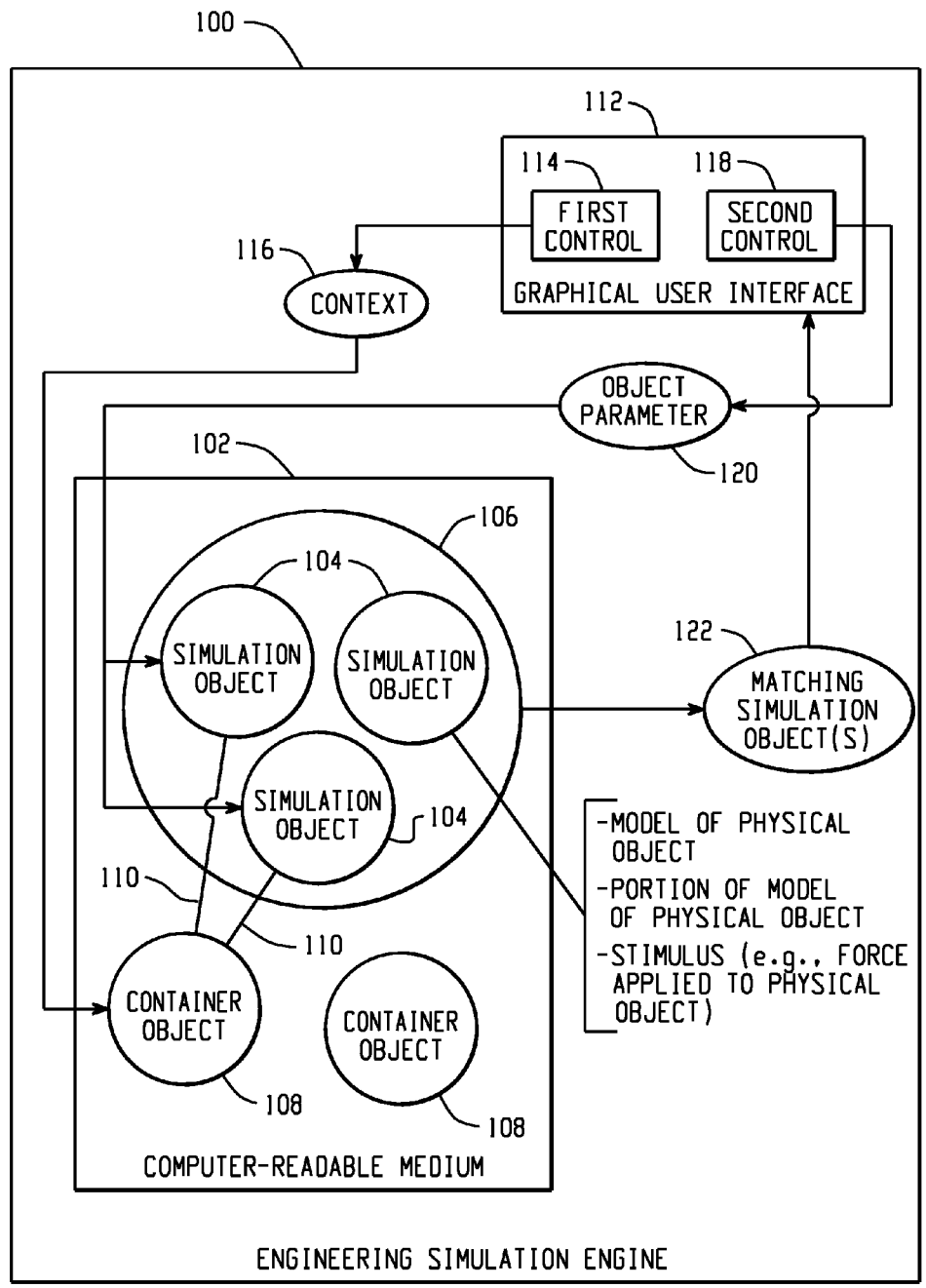
FIG. 1 is a block diagram depicting a system for providing a context-based search of simulation objects associated with an engineering simulation.

FIG. 1 is a block diagram depicting a system for providing a context-based search of simulation objects associated with an engineering simulation. The system 100 is configured to facilitate location of simulation objects, such as from a set of simulation objects associated with a current simulation, based upon the context of how those simulation objects are being used in the current simulation. Simulation objects can take a variety of forms. In one example, simulation objects are collections of one or more parameters that are used to define a physical property or other numerical representation of a model object (e.g., an exhaust manifold). In that example, simulation objects can interact with one another, such as to apply physical effects (e.g. forces, combustion) being simulated to the model object and to collect results (e.g., deformation, temperature) of the application of the physical effects for evaluation.

Simulations can be arbitrarily complex, including large numbers of model objects, application of many physical effects, and probing of several different result parameters. Such complex simulations can incorporate hundreds, thousands, or more simulation objects, with individual simulation objects being associated with individual portions (e.g., faces, edges, vertices) of the model object being simulated, parameters at each of those portions (e.g., pressure at a face of a first model object, temperature at a vertex of a second model object, wind velocity through a volume of the simulation), and result parameters being probed (e.g., deformation at an edge of a third model object, vibration frequency at the face of the first model object). Such large numbers of simulation objects can make location of a particular simulation object of interest difficult, where location of the particular simulation object may be desirable for tasks such as editing a parameter of the particular simulation object (e.g., the force to be applied at the first face of the first model object) or for accessing a result from the particular simulation object. Traditional hierarchical searches, such as breadcrumb bars and tree views, can be cumbersome and would require user-knowledge of the hierarchies for location of simulation objects. Hierarchical search systems also tend to require that child nodes be associated with a single parent.

The system 100 utilizes a system of container objects to facilitate context based searching of simulation objects, where container objects are associated with different contexts of the current simulation and where simulation objects can be associated with multiple, non-hierarchically related container objects. The system 100 for providing a context-based search of simulation objects associated with an engineering simulation includes a computer-readable medium 102 configured for storage of objects and records associated with the objects. The objects include a plurality of simulation objects 104 of a set 106 of simulation objects 104 associated with a current simulation. Each of the simulation objects 104 includes an associated record. A record associated with a simulation object includes an object parameter (e.g., a size of a face of a model object, a temperature, a category of the simulation object, a type of the simulation object) associated with the simulation object. The objects further include one or more container objects 108, where a container object is associated with a context of the current engineering simulation. A record associated with its associated container object identifies one or more simulation objects 104 that are associated with the container object 108, as illustrated at 110.

The system 100 further includes a graphical user interface 112 for display on a device and for selecting one or more filters to the simulation objects 104. The graphical user interface 112 includes a first control 114 for identifying a context 116 of the current simulation for searching. The graphical user interface 112 further includes a second control 118 for identifying an object parameter 120 for searching.

One or more data processors of the system 100 are configured to identify a container object 108 based on the context 116 identified via the first control 114. The identified container object 108 is associated with a subset of the simulation objects 104, as indicated at 110. The one or more data processors are further configured to search object parameters of the simulation objects in the subset 110 that are associated with the identified container object 108 using the identified object parameter 120 received via the second control 118 to identify matching simulation objects 122. Any matching simulation objects 122 are provided for display on the graphical user interface 112.

Figure 2:
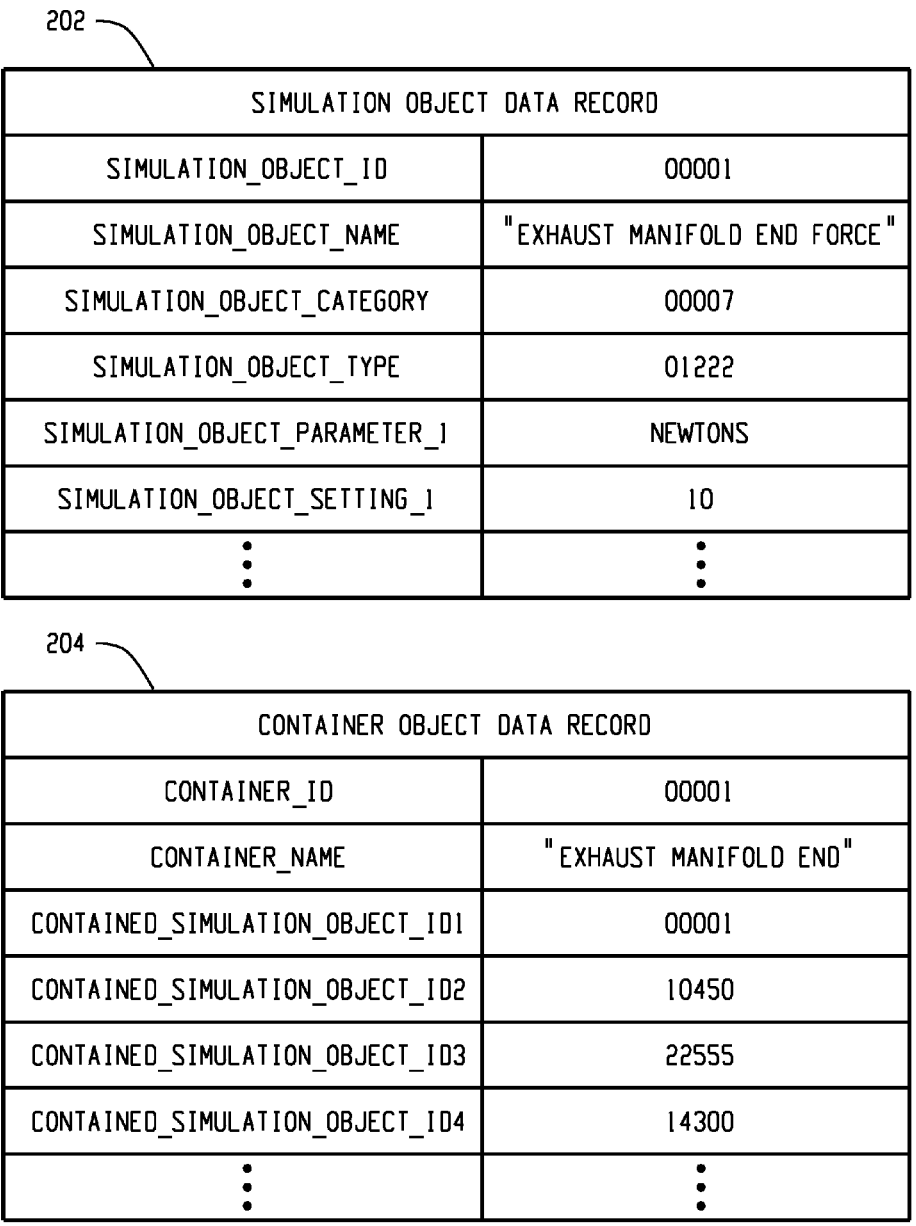
FIG. 2 is a diagram depicting example records associated with a simulation object and a container object.

FIG. 2 is a diagram depicting example records associated with a simulation object and a container object. Simulation objects and their associated records can be implemented and stored in a variety of ways. Simulation objects can be stored in memory in a flat format as objects in an object-oriented programming setting. Objects can also be stored in a database, such as a relational database or an object oriented database. In the example of FIG. 2, a simulation object data record 202 includes an index number for the simulation object as Simulation_Object_ID. A display name for the simulation object is identified in a Simulation_Object_Name field. A number of object parameters are also stored in the simulation object data record 202. The object parameters include a category with which the simulation object is associated, a type with which the simulation object is associated, an identification of units with which the simulation object is associated, and a value with which the simulation object is associated. The example simulation object data record 202 of FIG. 2 is associated with a force, currently set at 10 Newtons, applied at an end of an exhaust manifold model object, where the simulation object category and type fields are references to a particular simulation object category and type whose details are stored in other tables.

A container object data record 204 is associated with a container object that is associated with a particular context of the engineering simulation. In the example of FIG. 2, the container object is associated with the exhaust manifold end. The container object data record 204 associated with the container object includes an index field Container_ID and a display name field Container_Name. The container object data record 204 further identifies one or more simulation objects that are associated with the container object and its associated context, such as via a linked list, a search criteria of all simulation objects associated with the container object, or a number of fields containing indexes of associated simulation object data records, as shown in FIG. 2. For example, a first simulation object index field of the depicted container object data record 204 indicates that simulation object "00001" is associated with the Exhaust Manifold End context, where simulation object "00001" is shown at 202 and is associated with a force applied to the exhaust manifold end.

Figure 3:
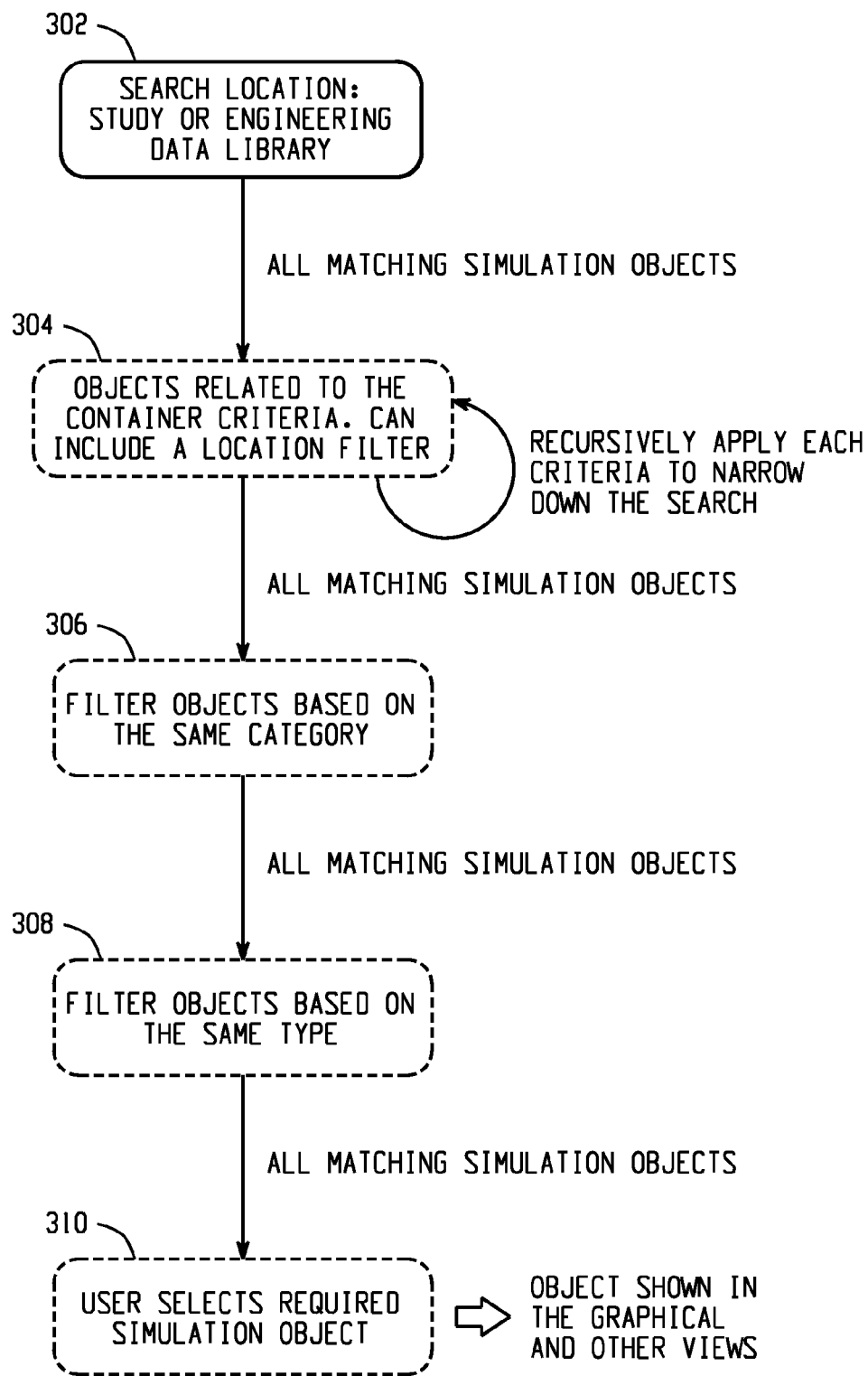
FIG. 3 is a flow diagram depicting a process for searching for simulation objects.

FIG. 3 is a flow diagram depicting a process for searching for simulation objects. At 302 a set of simulation objects associated with a current simulation are identified by a system. At 304, one or more contexts of the current simulation are selected, where those contexts are used to identify associated container objects. The pool of simulation objects are filtered based on the selection of container objects and any criteria specified among the container objects (e.g., searching for simulation objects that are in both Context A and Context B, simulation objects that are in Context A but not Context C). Simulation objects that meet the filter can be further filtered based on object parameters associated with those remaining simulation objects. In the example of FIG. 3, a filter is applied to the remaining simulation objects based on a category object parameter at 306 and a type object parameter at 308. All matching simulation objects are displayed, and at 310, the user selects the simulation object for which he was searching, and details of the selected simulation object are displayed.

Figure 4:
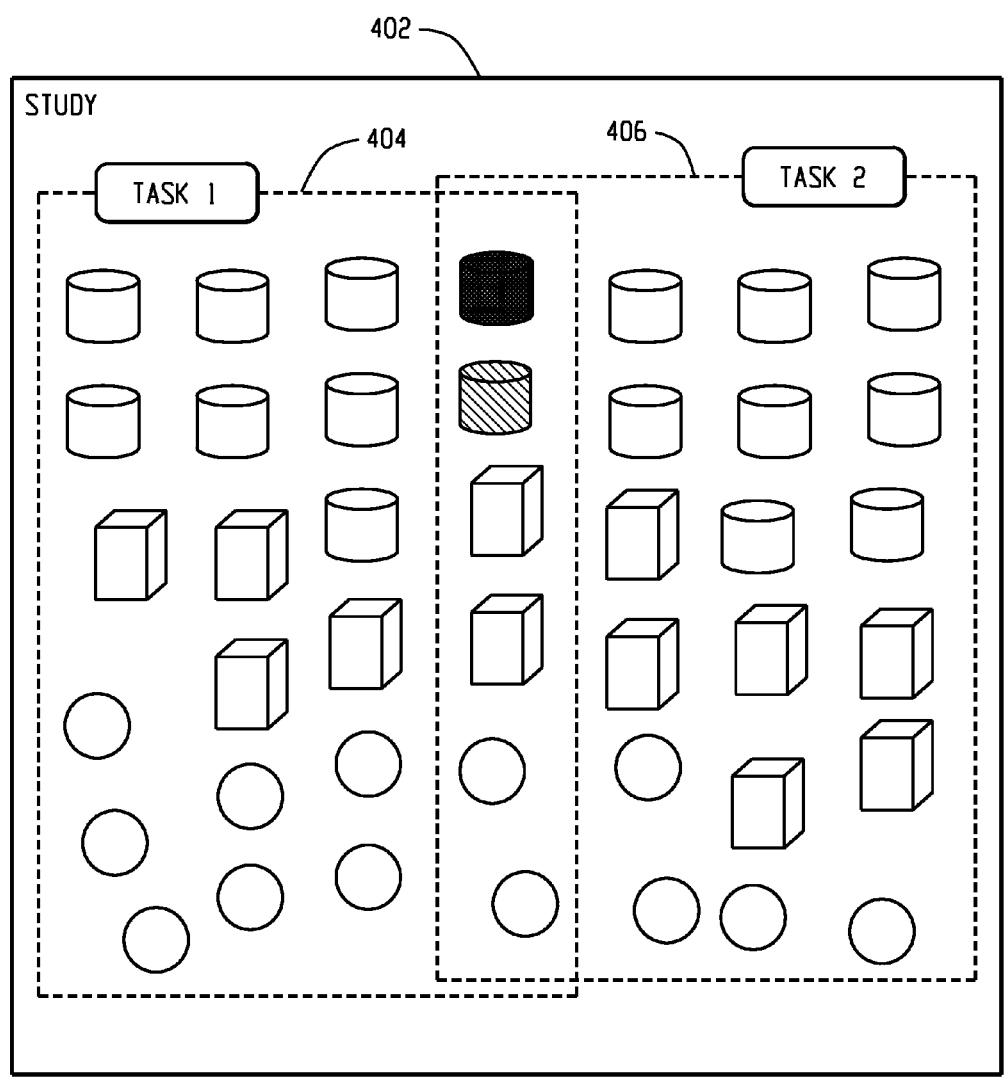
FIG. 4 illustrates a first step of an example context-based search of simulation objects.
Figure 5:
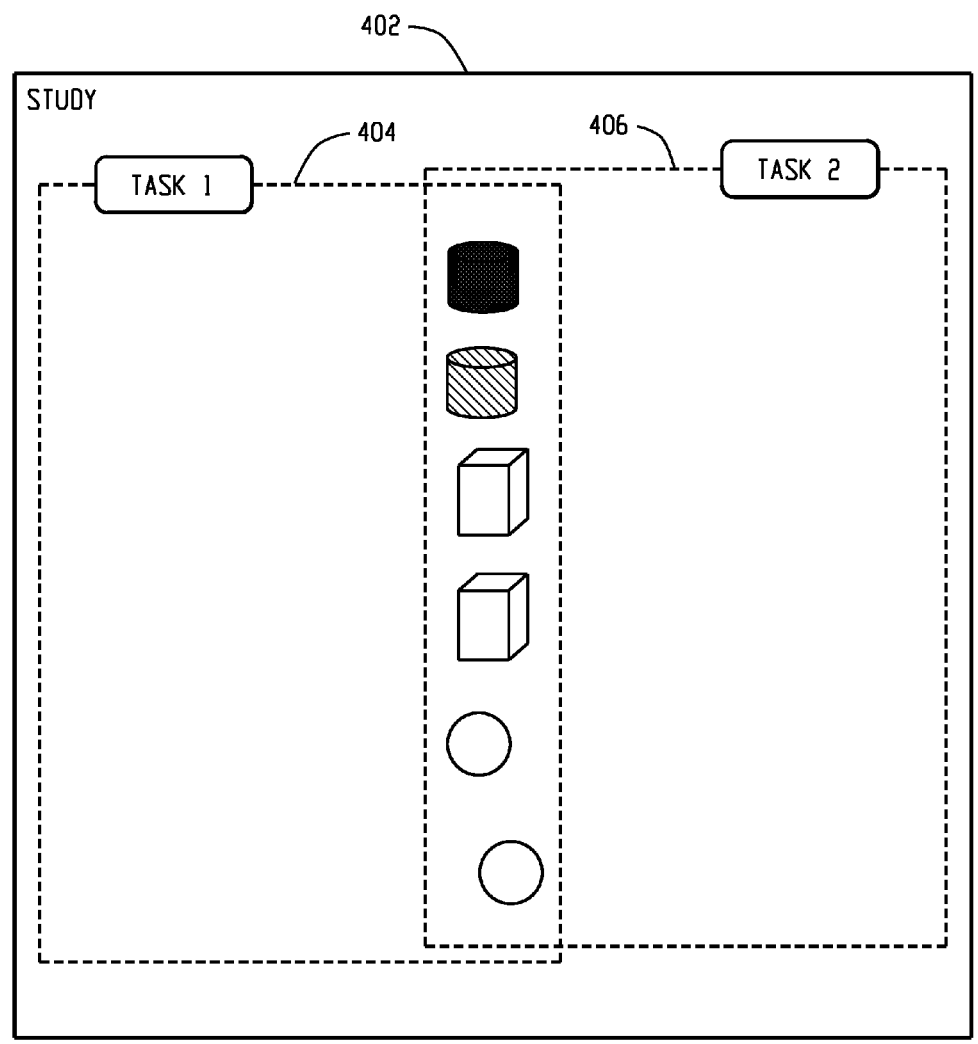
FIG. 5 illustrates a second step of an example context-based search of simulation objects.

FIGS. 4-6 illustrate an example context-based search of simulation objects. In FIG. 4 a global set of simulation objects, depicted as cylinders, boxes, and circles, associated with a current simulation 402 are displayed. Simulations can be structured as a set of tasks (e.g., ordered tasks) to be performed. In such a simulation, each task represents a context of the simulation and can be associated with a container object. In the example of FIG. 4, a first container object 404 is associated with a first task of the simulation 402, and a second container object 406 is associated with a second task of the simulation 402. Each of the container objects identifies simulation objects associated with that container object and its associated context. Six simulation objects are associated with both task 1 and task 2 and are thus identified by both the first container object 404 and the second container object 406.

Figure 6A:
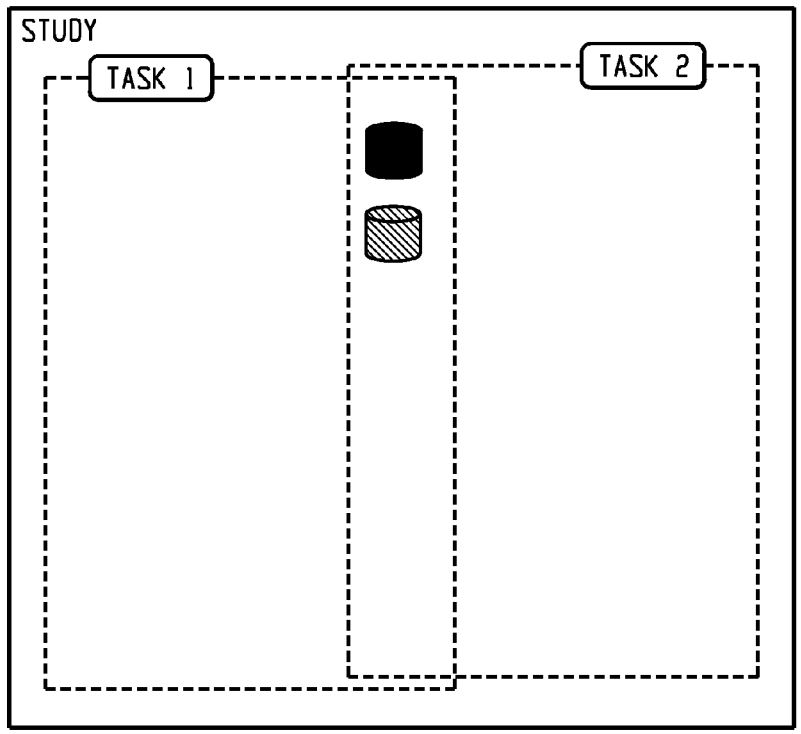
FIG. 6A illustrates a third step of an example context-based search of simulation objects.
Figure 6B:
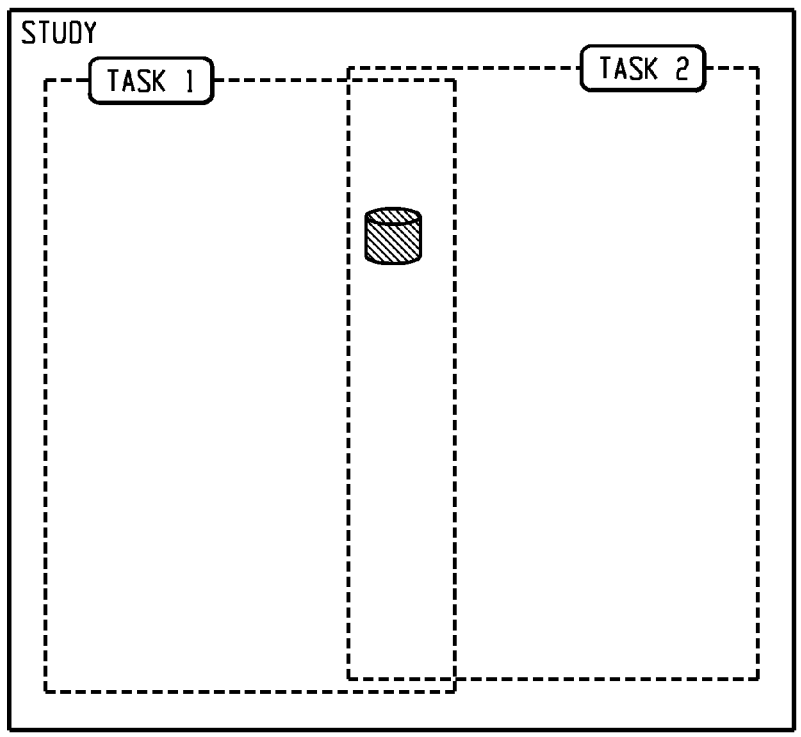
FIG. 6B illustrates a fourth step of an example context-based search of simulation objects.

FIG. 5 depicts the six simulation objects of the simulation that remain after application of a context filter that seeks simulation objects associated with both task 1 and task 2, where such filtering is performed by identifying which simulation objects are associated with both the first container object 404 and the second container object 406. Following context filtering, one or more additional simulation-object object parameter searches can be performed to further narrow the results set. In FIG. 6A, a category filter is applied to identify simulation objects that are associated with the hypothetical category "Cylinder." Two simulation objects remain in the results set. In FIG. 6B, a further cascading filter is applied that seeks remaining simulation objects associated with a hypothetical type of "Light Gray." One simulation object remains in the results set, where that simulation object can be identified to a searcher via a graphical user interface.

Figure 7:
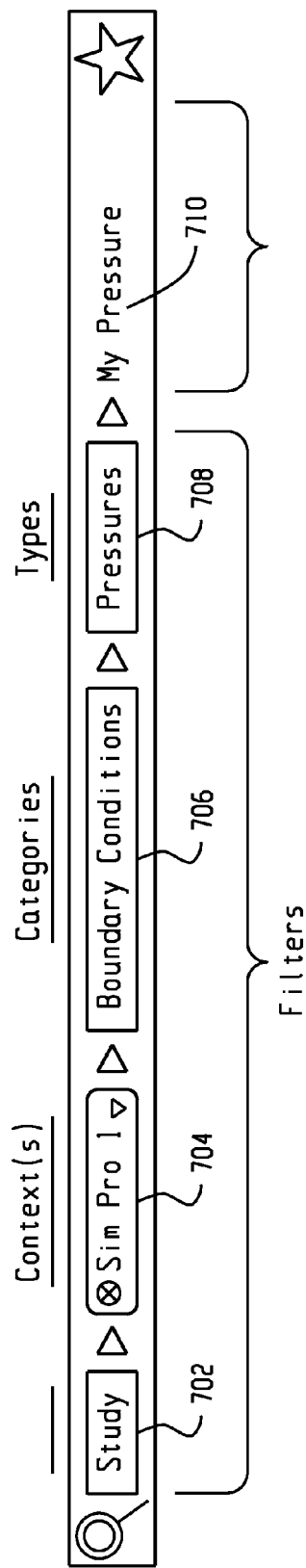
FIG. 7 is a diagram depicting an example graphical user interface control for specifying context-based search parameters.

FIG. 7 is a diagram depicting an example graphical user interface control for specifying context-based search parameters. The user interface control includes a current simulation selection input 702 that indicates a current simulation to be searched and enables change of the current simulation. A first control 704 enables identification of a selected context of the current simulation for searching. In the example of FIG. 7, a user has selected the Sim Pro 1 context, and the system has limited downstream results displayed to those simulation objects that are identified by a container object associated with the Sim Pro 1 context. A second control 706 enables identifying a first object parameter by which to further narrow the search. In the example of FIG. 7, the second control 706 provides a category filter, where a user has specified that he wishes the simulation objects associated with the Sim Pro 1 context to be further limited to those associated with the "Boundary Conditions" category. A third control 708 enables identifying a further object parameter by which to further narrow the search. In FIG. 7, the third control provides a type filter, where a user has specified that results should further be limited to simulation objects associated with the "Pressures" type. Based on the filters applied 702, 704, 706, 708, a set of matching simulation objects is displayed to the user in the graphical user interface for selection and further exploration. In the example of FIG. 7, the user has selected the "My Pressure" simulation input object for further interaction, and that selection is indicated at 710.

Figure 8:
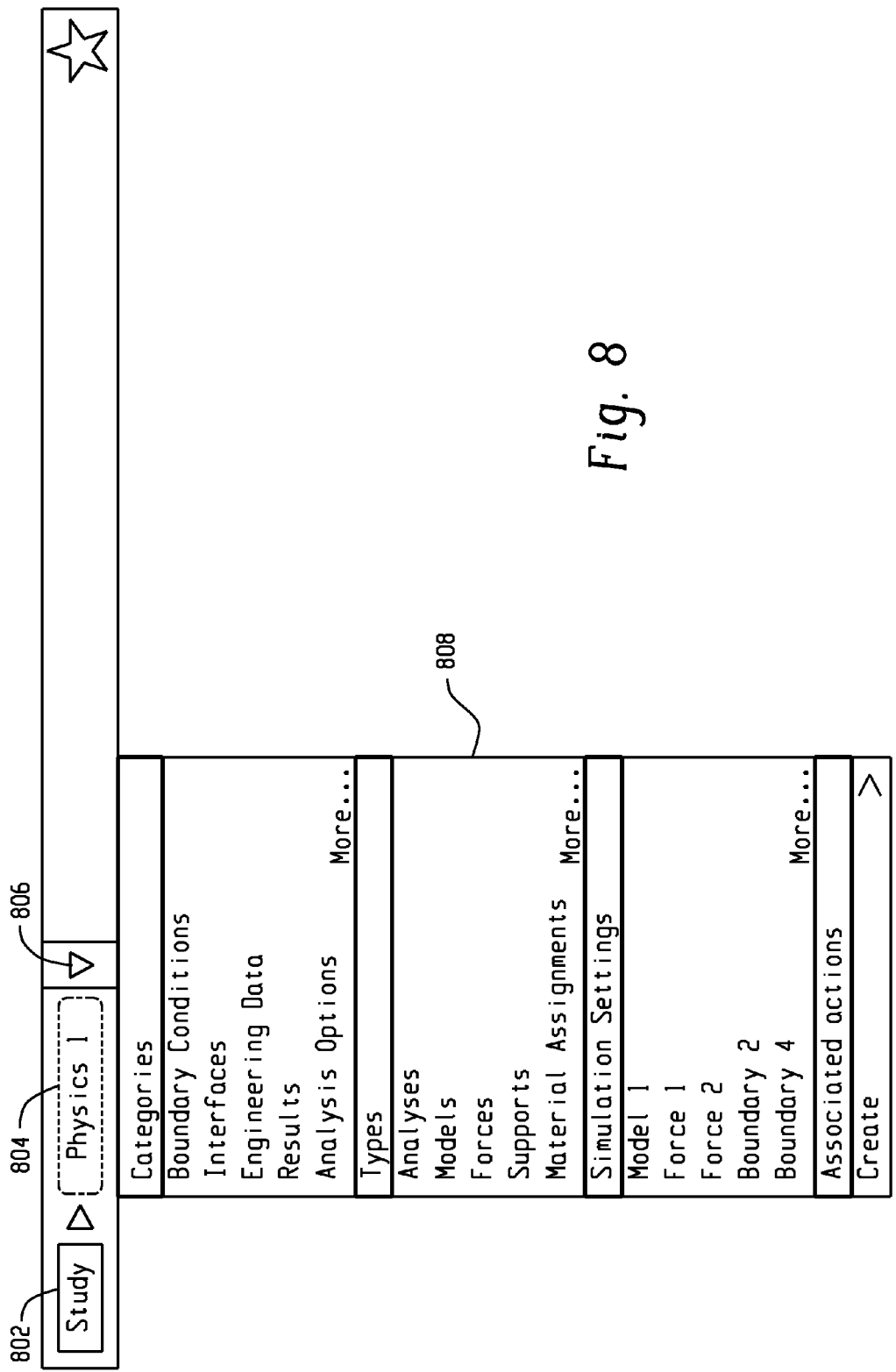
FIG. 8 depicts a first step of an example selection of search parameters for a context-based search.
Figure 9:
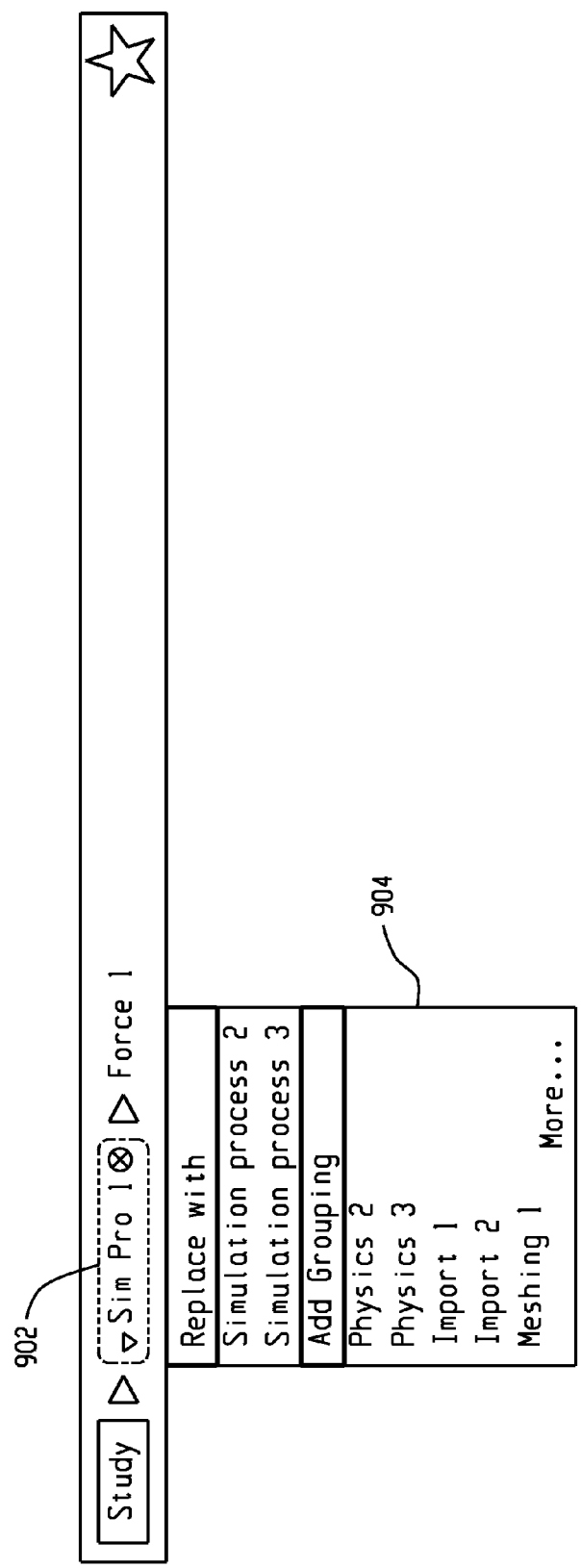
FIG. 9 depicts a second step of an example selection of search parameters for a context-based search.
Figure 10:
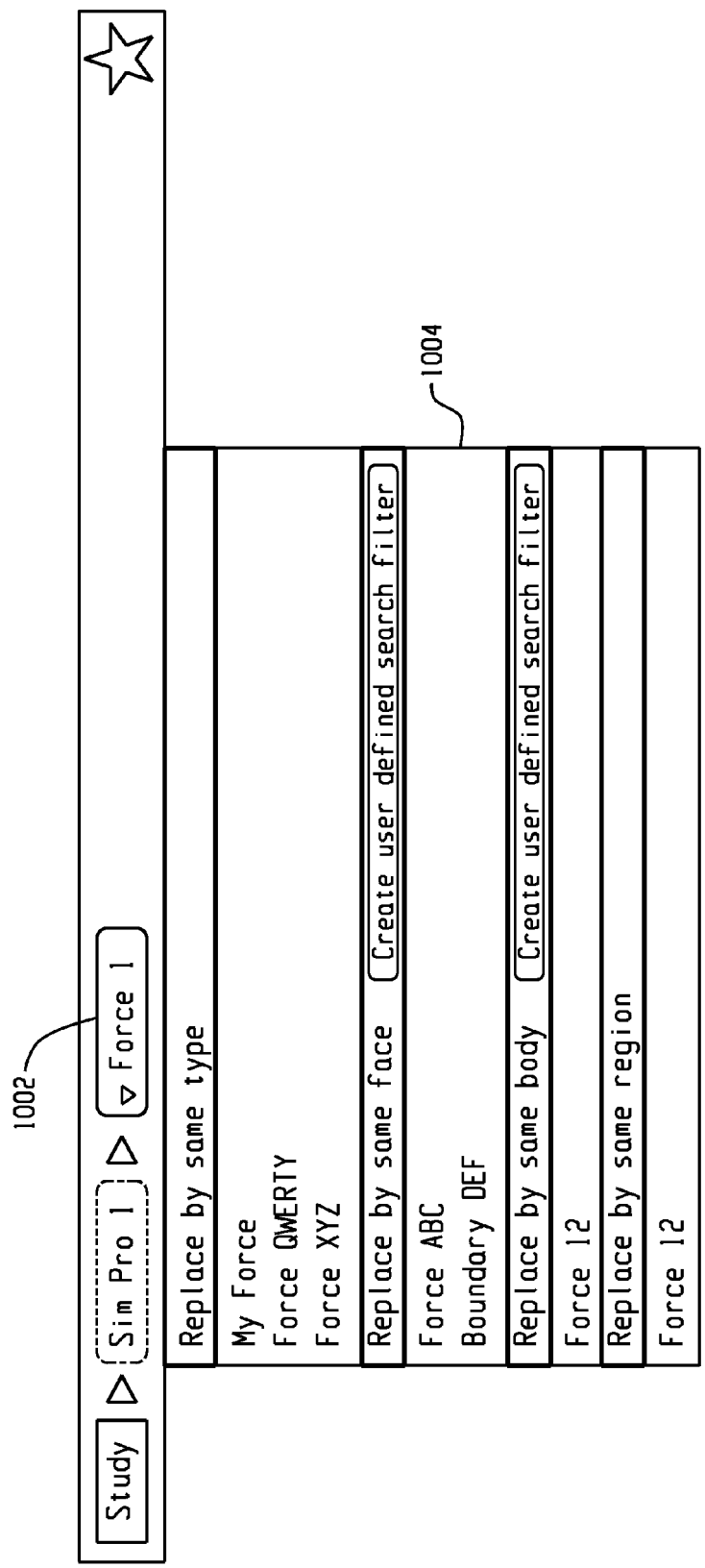
FIG. 10 depicts a third step of an example selection of search parameters for a context-based search.

FIGS. 8-10 depict example selection of search parameters for a context-based search. In FIG. 8, a current simulation is identified by the "Study" identifier at 802, and a first context "Physics 1" has been selected by a user using a first control 804. In the example of FIG. 8, a user has selected an additional filter selection control 806 to add a further filter to the context-based search. Simulation objects associated with the current simulation and the Physics 1 context can be displayed in a results set (not shown). Selecting the additional filter selection control 806 in the graphical user interface commands a menu display 808 for specifying an additional filter to apply. In the example of FIG. 8, the menu 808 is populated with additional filters that are deemed by the system likely to be effective at further limiting the simulation objects of a results set. For example, the system provides filters for selection based on simulation objects that remain after application of previous filters, such as application of the Physics 1 context filter at 804. Thus, the menu 808 displays only categories with which simulation objects in the Physics 1 context are associated, only types with which simulation objects in the Physics 1 context are associated, and only other simulation setting object parameters with which simulation objects in the Physics 1 context are associated.

FIG. 9 depicts the graphical user interface control when a user has selected the first control for identifying a context of the simulation for searching. The user interface control has already been manipulated to select the Sim pro 1 context and the Force 1 simulation object. The user has now decided to consider changing the desired context by clicking on the first control 902. Selection of the first control 902 commands the system to provide a menu 904 of other contexts for selection. The context selection menu 904 provides a listing of contexts that are available in the current simulation "Study." Certain of those contexts, Simulation process 2 and simulation process 3, are system generated based on tasks of the current simulation. Thus, selection of the Simulation process 2 would command access of the container object associated with the Simulation process 2 task to identify simulation objects associated with that task. In addition to system defined contexts, user defined contexts (e.g., Physics 2, Import 1, Meshing 1) can be selected as well. User defined contexts, as described further herein, can be defined in a variety of ways, such as based on user defined search criteria, a results set of a user search, and selection of certain simulation objects in a simulation visualization.

FIG. 10 depicts the graphical user interface control upon user selection of the selected simulation object. Upon selection of the selected simulation object 1002, a menu 1004 is displayed that depicts other simulation objects for selection. Such additional simulation objects may be arranged in a variety of ways, such as categorized by the same type as the current simulation object or other criteria of the current simulation object to enable quick selection of similar simulation objects.

Figure 11:
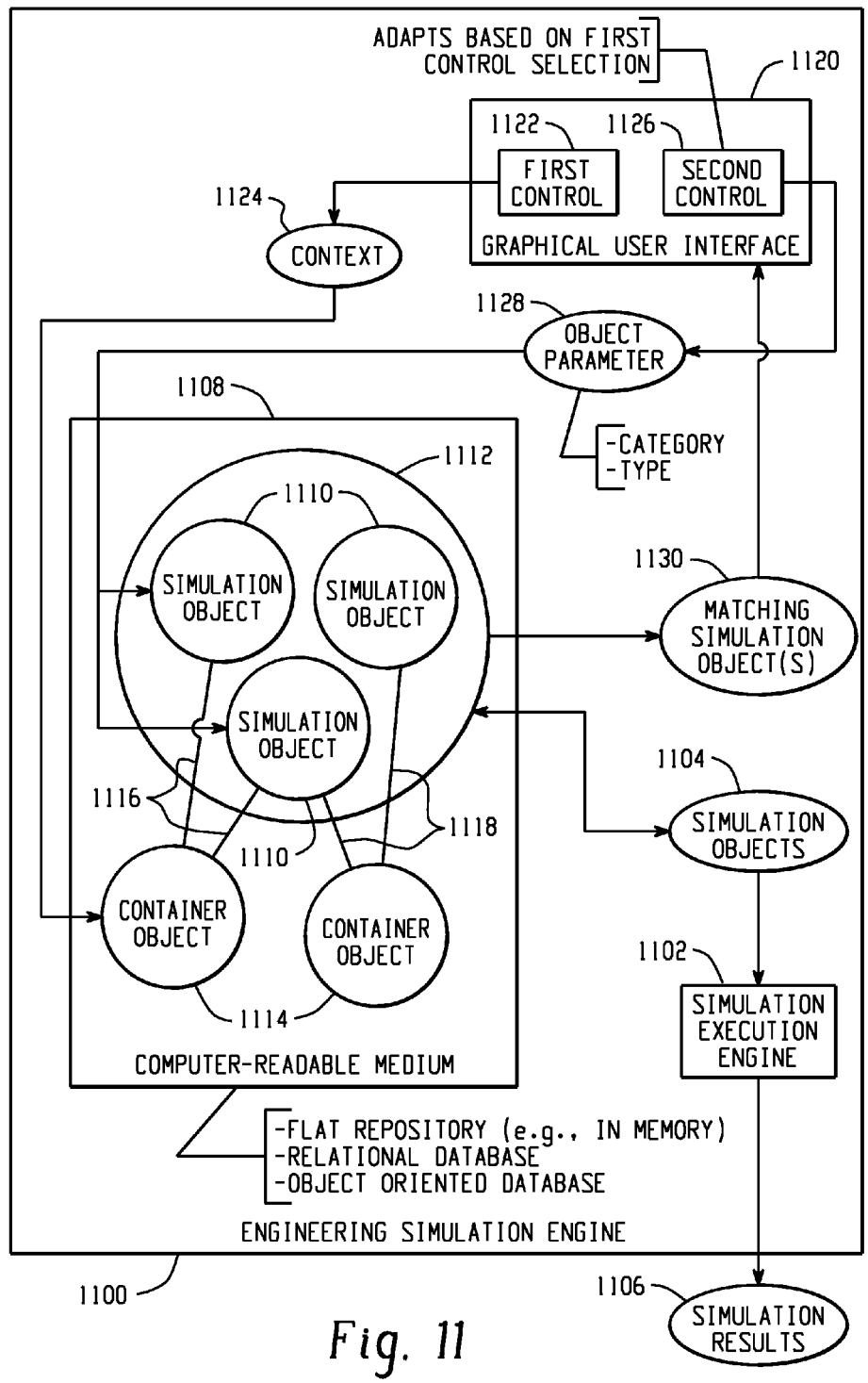
FIG. 11 is a block diagram depicting a system for providing a context-based search of simulation objects, where one or more data processors utilize those simulation objects to execute a simulation.

FIG. 11 is a block diagram depicting a system for providing a context-based search of simulation objects, where one or more data processors utilize those simulation objects to execute a simulation. The system 1100 includes a simulation execution engine 1102 that utilizes one or more data processors to execute a simulation using a set of simulation objects 1104. Certain of the simulation objects 1104 can be examined to extract simulation results 1106 for downstream processing and analysis. A computer-readable medium 1108 is configured to store the simulation objects 1104 including records 1110 associated with the set 1112 of simulation objects utilized by the simulation execution engine 1102 for the current simulation.

The objects stored on the computer-readable medium include the plurality of simulation objects 1110 of the set 1112 of simulation objects 1110 associated with a current simulation. Each of the simulation objects 1110 includes an associated record. The objects further include one or more container objects 1114, where a container object is associated with a context of the current engineering simulation. A record associated with its associated container object identifies one or more simulation objects 1110 that are associated with the container object 1114, as illustrated at 1116, 1118.

The system 1110 further includes a graphical user interface 1120 for display on a device and for selecting one or more filters to the simulation objects 1110. The graphical user interface 1120 includes a first control 1122 for identifying a context 1124 of the current simulation for searching. The graphical user interface 1120 further includes a second control 1126 for identifying an object parameter 1128 for searching. In the example of FIG. 11, filters identified for selection by the second control 1126 may be adapted based on the context 1124 selected by the first control 1122 (e.g., the second control 1126 only identifies category filters for categories associated with simulation objects 1110 associated with the selected context 1124).

One or more data processors of the system 1100 are configured to identify a container object 1114 based on the context 1124 identified via the first control 1122. The identified container object 1114 is associated with a subset of the simulation objects 1110, as indicated at 1116. The one or more data processors are further configured to search object parameters of the simulation objects 1110 in the subset 1116 that are associated with the identified container object 1114 using the identified object parameter 1128 received via the second control 1126 to identify matching simulation objects 1130. Any matching simulation objects 1130 are provided for display on the graphical user interface 1120.

Figure 12:
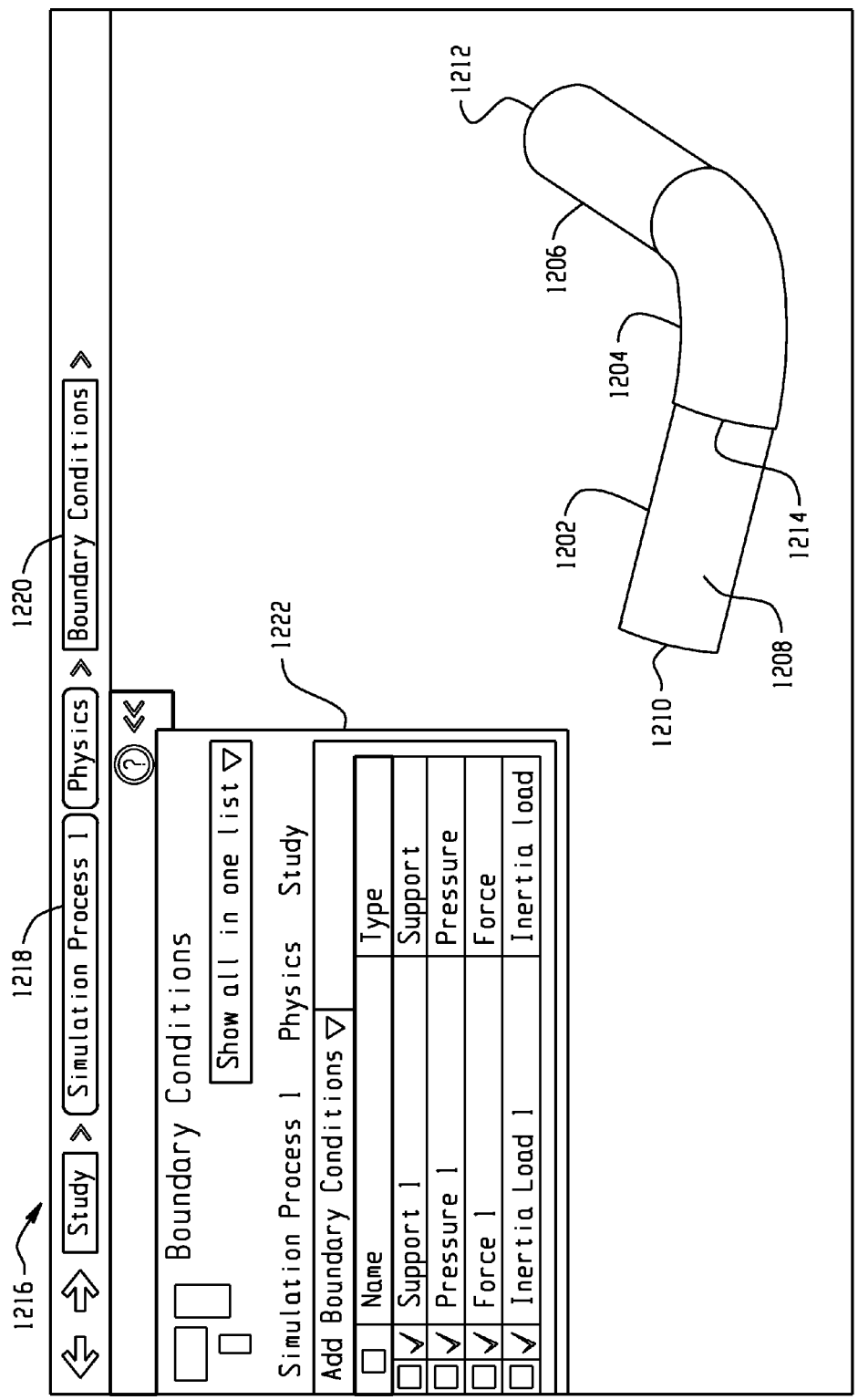
FIG. 12 is a diagram depicting a simulation visualization in addition to an interface control for providing a context-based search of simulation objects associated with the current simulation.

FIG. 12 is a diagram depicting a simulation visualization in addition to an interface control for providing parameters of a context-based search of simulation objects associated with the current simulation. The simulation visualization depicts simulation objects associated with three portions 1202, 1204, 1206 of an exhaust manifold model object. Additional simulation objects are associated with each of those portions, such as a simulation object associated with an outside face 1208 of the first portion 1202 and an edge 1210 of the first portion. Additional simulation objects may be associated with a heat source applied at an edge 1212 of the third portion 1206 and a temperature observed at the interface 1214 between the first portion 1202 and the second portion 1204.

An interface control 1216 at the top of the graphical user interface enables performing a context-based search of simulation objects associated with the current simulation. A first control 1218 has been utilized to select simulation objects that are in both the Simulation Process 1 context and the Physics context. A second control 1220 has been utilized to identify the Boundary Conditions category object parameter for further filtering the simulation objects. A results pane 1222 indicates simulation objects that meet the criteria of the filters applied using the interface control 1216.

Figure 13:
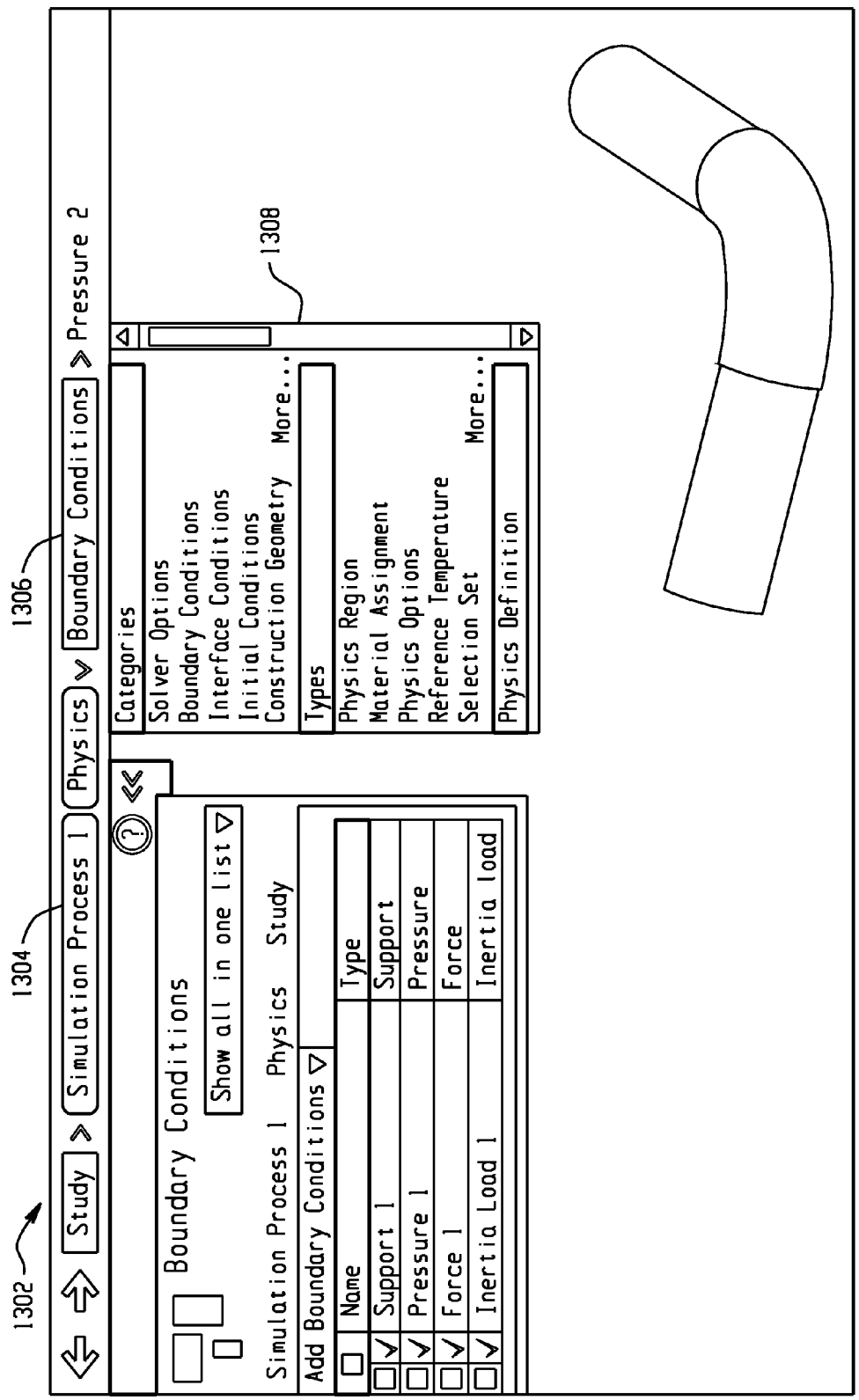
FIG. 13 is a diagram depicting a menu provided upon selection of the second control for application of a different object parameter filter.
Figure 14:
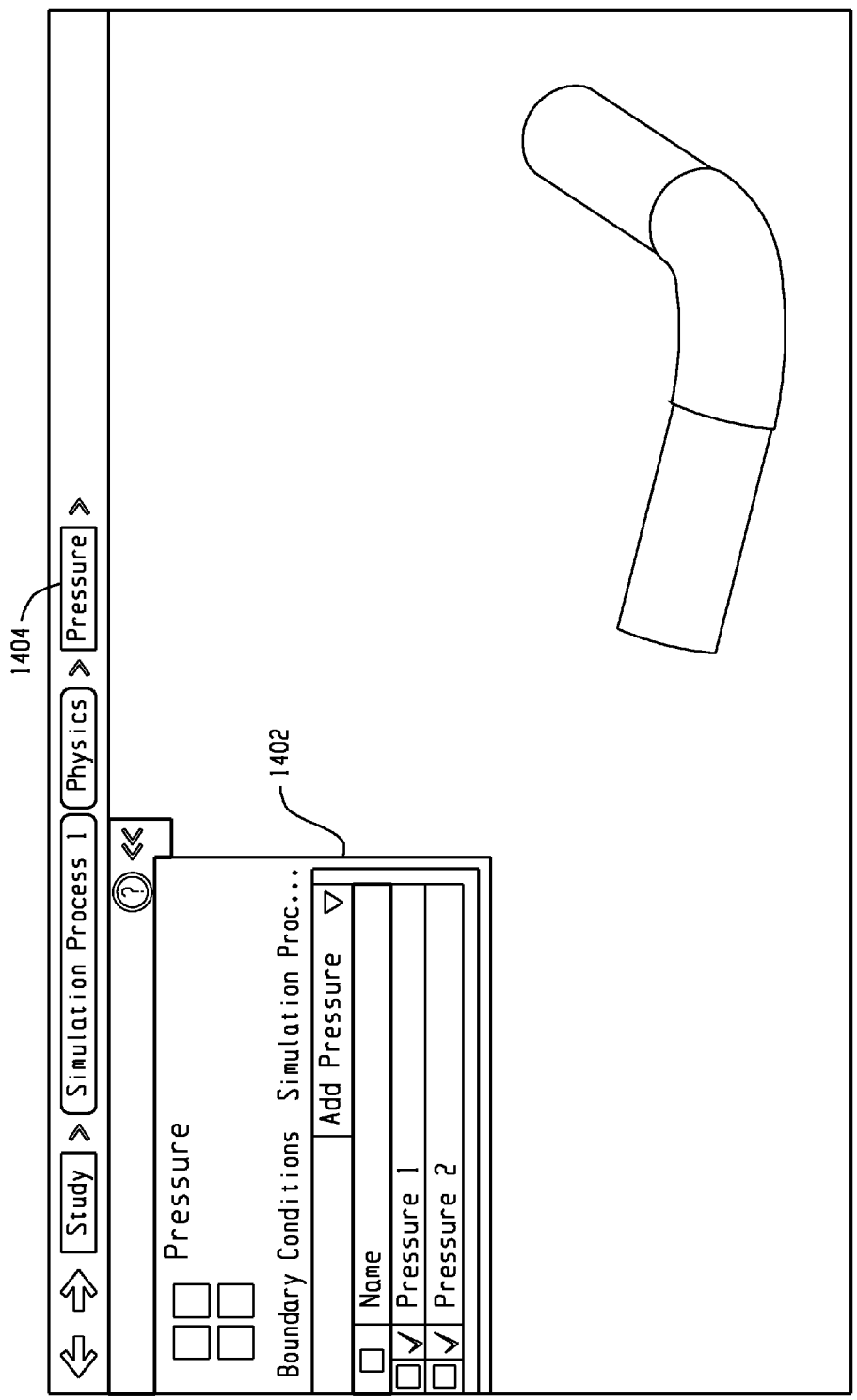
FIG. 14 is a diagram depicting a results set that is displayed following selection of a Physics object type parameter using the second control.

FIG. 13 is a diagram depicting a menu provided upon selection of the second control for application of a different object parameter filter. The interface control 1302 has been utilized to select the union of two contexts (Simulation Process 1 and Physics) to be searched using a first control 1304. A second control 1306 had previously been utilized to select a Boundary Conditions category control. A user has selected the second control, such as via mouse or keyboard input, to command display of a menu 1308 of options for a different object parameter filter to be applied, such as another category filter (e.g., a size control category, a boundary condition category, an interface condition category, a source category, a results category, a construction geometry category, a monitor category), a type filter (e.g., a force type, an inlet type, an outlet type, a physics region type, a support type, a contour type, an isosurface type, an edge sizing type, a reference frame type), or another object parameter filter. FIG. 14 is a diagram depicting a results set 1402 that is displayed following selection of a Physics object type parameter using the second control 1404. In the results set display 1402, simulation objects of the current simulation that are associated with both the Simulation Process 1 context and the Physics context and that are a physics object type are displayed for selection. Upon selection, parameters of the selected simulation object can be examined and changed by the user.

Figure 15:
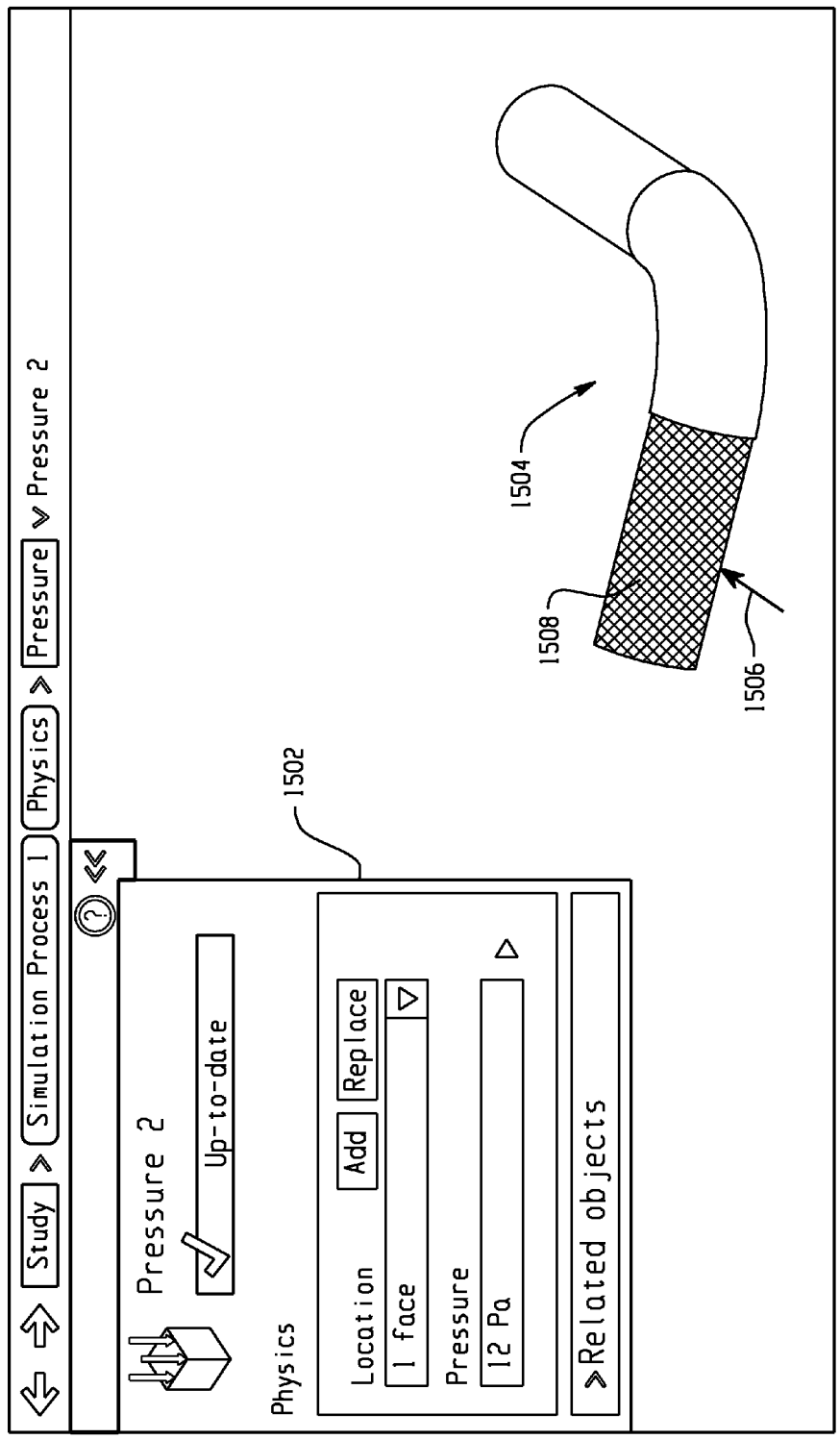
FIG. 15 is a diagram depicting additional parameters of a selected simulation object.

FIG. 15 is a diagram depicting additional parameters of a selected simulation object. The Pressure 2 simulation object was selected from the results display depicted in FIG. 14. Upon selection of the Pressure 2 simulation object, further object parameters of the Pressure 2 simulation object are displayed at 1502 including a location associated with the Pressure 2 simulation object and a pressure amount associated with the Pressure 2 simulation object. In the example of FIG. 15, the simulation visualization 1504 is updated based on selection of the Pressure 2 simulation object to highlight (by color and indicating arrow 1506) the location associated with that simulation object (i.e., the outside face of one of the portions 1508 of the exhaust manifold). The depicted parameters (i.e., location, pressure amount) can be changed by the user using the dropdown controls or otherwise (e.g., the location can be controlled by dragging the location indicating arrow 1506 to another place in the simulation visualization). The example of FIG. 15 illustrates an example relationship among simulation objects in a simulation, where a pressure simulation object (Pressure 2) is associated with a geometry simulation object (1 Face) of a model object portion simulation object (Portion 1508 of the exhaust manifold).

Figure 16:
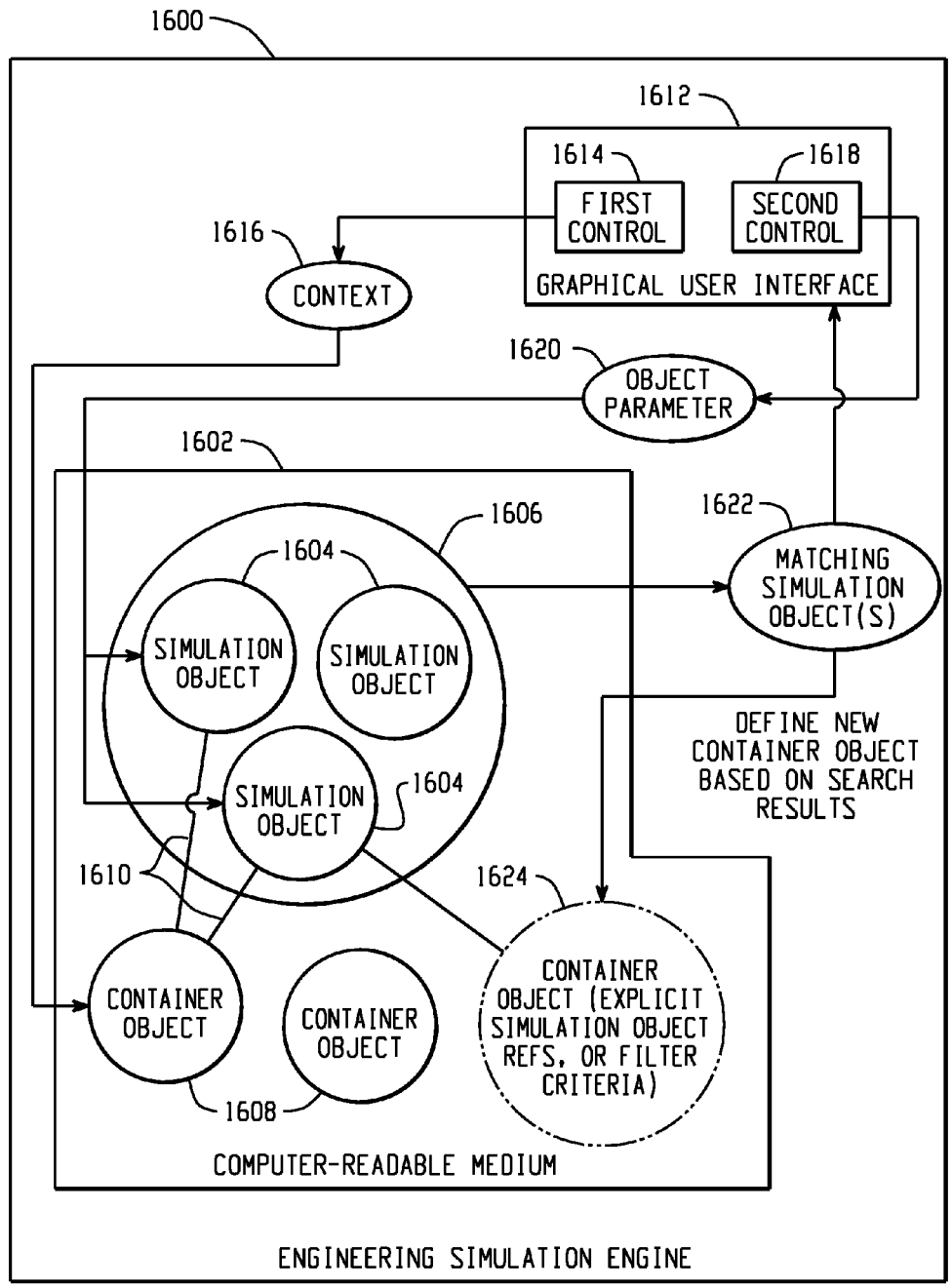
FIG. 16 is a block diagram depicting an example mechanism for user definition of a container object.

As discussed above, contexts and associated container objects can be automatically generated by a system based on a current simulation. For example, container objects may be automatically generated to identify simulation objects associated with a particular task context or container objects may be automatically generated to identify simulation objects associated with geometric portions of a model object simulation object (e.g., an outside face of an end portion of an exhaust manifold). In addition to automatically generated contexts and associated container objects, container objects can be user defined. FIG. 16 is a block diagram depicting an example mechanism for user definition of a container object. The system 1600 includes a computer-readable medium 1602 configured for storage of objects and records associated with the objects. The objects include a plurality of simulation objects 1604 of a set 1606 of simulation objects 1604 associated with a current simulation. The objects further include one or more container objects 1608, where a container object 1608 is associated with a context of the current engineering simulation. A record associated with its associated container object identifies one or more simulation objects 1604 that are associated with the container object 1608, as illustrated at 1610.

The system 1600 further includes a graphical user interface 1612 for display on a device and for selecting one or more filters to the simulation objects 1604. The graphical user interface 1612 includes a first control 1614 for identifying a context 1616 of the current simulation for searching. The graphical user interface 1612 further includes a second control 1618 for identifying an object parameter 1620 for searching.

One or more data processors of the system 1600 are configured to identify a container object 1608 based on the context 1616 identified via the first control 1614. The identified container object 1608 is associated with a subset of the simulation objects 1604, as indicated at 1610. The one or more data processors are further configured to search object parameters of the simulation objects in the subset 1610 that are associated with the identified container object 1608 using the identified object parameter 1620 to identify matching simulation objects 1622. Matching simulation objects 1622 are provided for display on the graphical user interface 1612.

A user can define a user defined container object 1624 based on the set 1622 of returned matching simulation objects. The user-defined container object 1624 is stored in the computer-readable medium 1602 and identifies simulation objects 1604 associated with the user-defined container object 1624 and its associated context. For example, a user can command generation of the user-defined container object 1624 to contain the specific matching simulation objects 1622 returned by the current search. In such an instance, the user-defined container object 1624 would include specific references to the simulation object(s) 1604 returned by the current search at 1622. In another example, the user can command generation of the user-defined container object 1624 to contain simulation objects 1622 that meet the filter criteria (e.g., context 1616 and object parameter 1620) of the current search, where those filter criteria are stored in a record associated with the user-defined container object and are applied to simulation objects associated with the current simulation when the user-defined container object 1624 (or its associated context) are selected.

Figure 17:
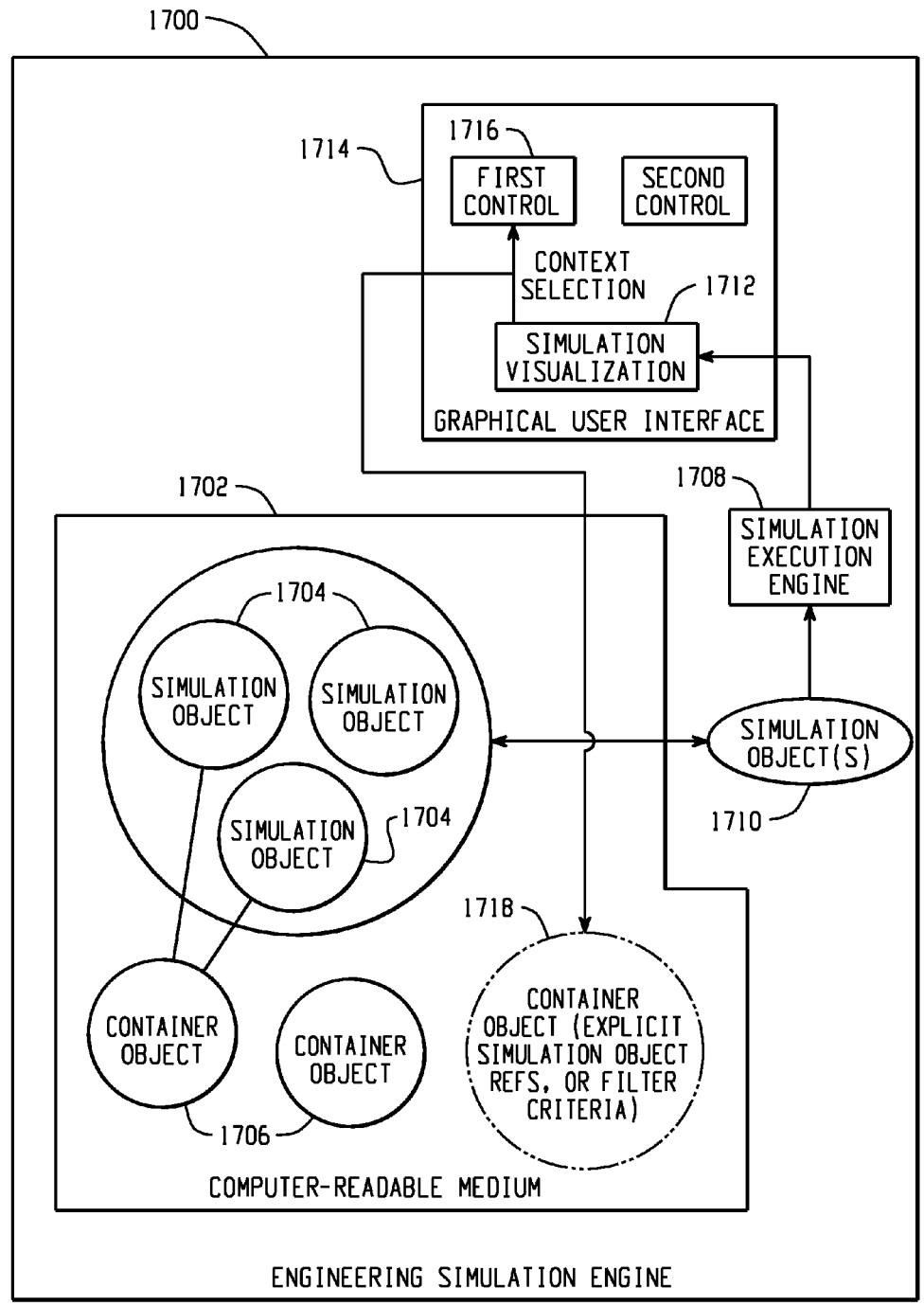
FIG. 17 is a block diagram depicting another mechanism for user-definition of a container object.

FIG. 17 is a block diagram depicting another mechanism for user-definition of a container object. A system 1700 includes a computer-readable medium 1702 that includes records associated with objects that include simulation objects 1704 and container objects 1706. A simulation execution engine 1708 utilizes simulation objects 1710 to execute a simulation, where a visualization 1712 of the simulation (e.g., visualization of simulation objects involved in the simulation and results of the simulation) is provided for display on a graphical user interface 1714. The graphical user interface 1714 includes one or more controls for identifying parameters of a search of simulation objects involved in the current simulation. For example, a first control 1716 is configured to receive an identification of a context of the simulation for searching. In one embodiment, a user can utilize graphics of the simulation visualization 1712 to generate and select a user-defined context and associated container object 1718. For example, by selecting certain model objects depicted in the simulation visualization 1712, a context is defined associated with those model objects. A corresponding user-defined container object 1718 is generated and stored as a record in the computer-readable medium 1702, where the container object identifies simulation objects associated with the selected model objects (e.g., an explicit listing of all simulation objects associated with the selected model objects, a filter criteria that instructs a search to identify all simulation objects associated with the selected model objects) when the user-defined context is selected. Upon selection of the model objects and definition of the user-defined context and associated container object 1718, the first control 1716 may be updated to reflect that the user-defined context is a parameter of a current simulation object search.

Figure 18:
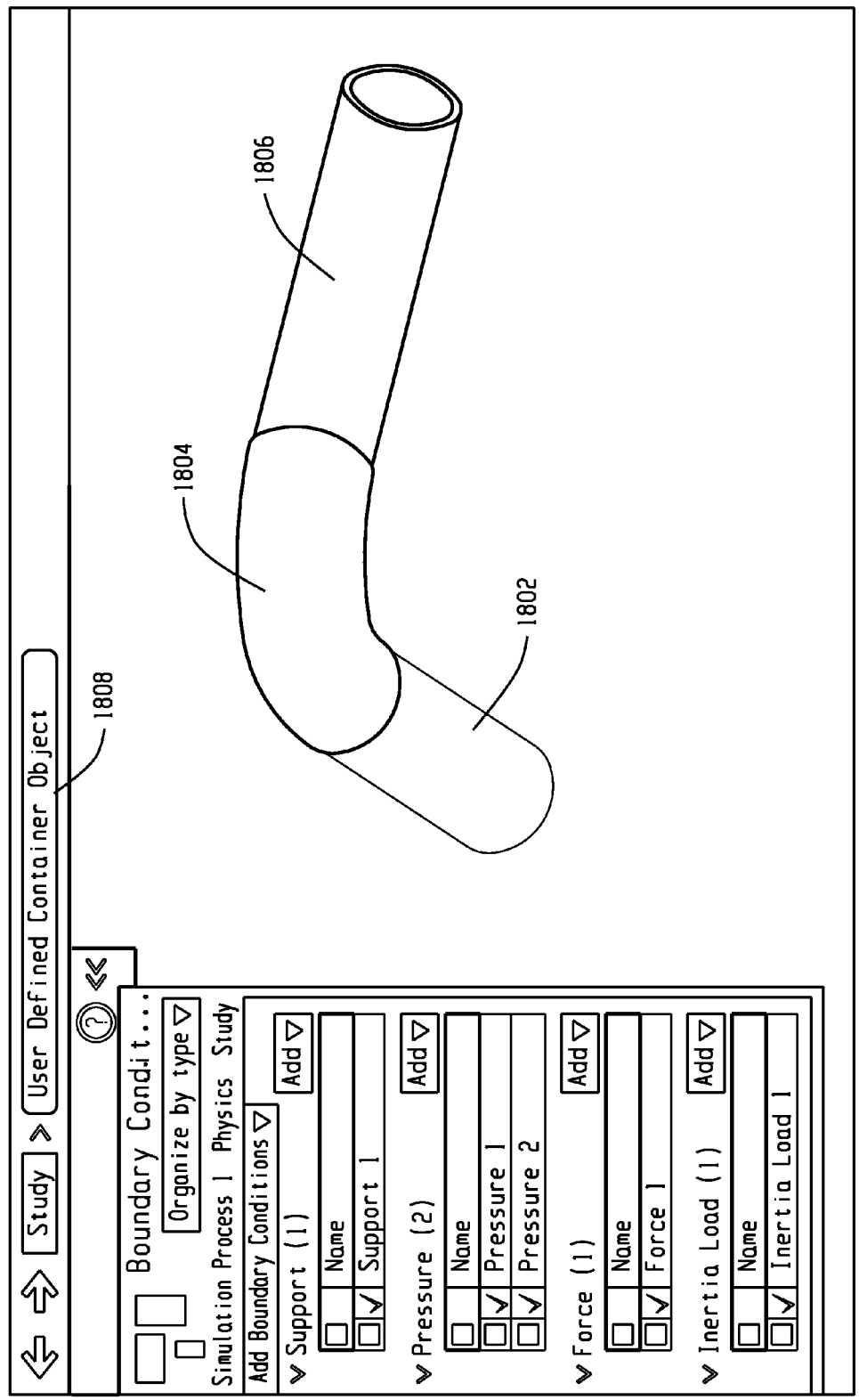
FIG. 18 is a diagram depicting a graphical user interface and selection of model objects for defining a user-defined context and associated container object.

FIG. 18 is a diagram depicting a graphical user interface and selection of model objects for defining a user-defined context and associated container object. The graphical user interface includes a depiction of model objects 1802, 1804, 1806 associated with a current simulation, where those model objects are associated with portions of an exhaust manifold. Each of the portions 1802, 1804, 1806 is represented by a simulation object. A user has selected two portions 1804, 1806 of the exhaust manifold and has commanded creation of a user-defined context associated with the two selected portions 1804, 1806. A container object is generated based on the definition of the user-defined context, where the container object identifies all simulation objects that are associated with the two selected portions 1804, 1806 of the exhaust manifold. The user can input metadata to be associated with the user-defined context and container object for future reference, such as a name (User Defined Container Object). In the example of FIG. 18, a first control 1808 of an interface control is updated to indicate the user-defined context when the user commands definition of that context.

Figure 19:
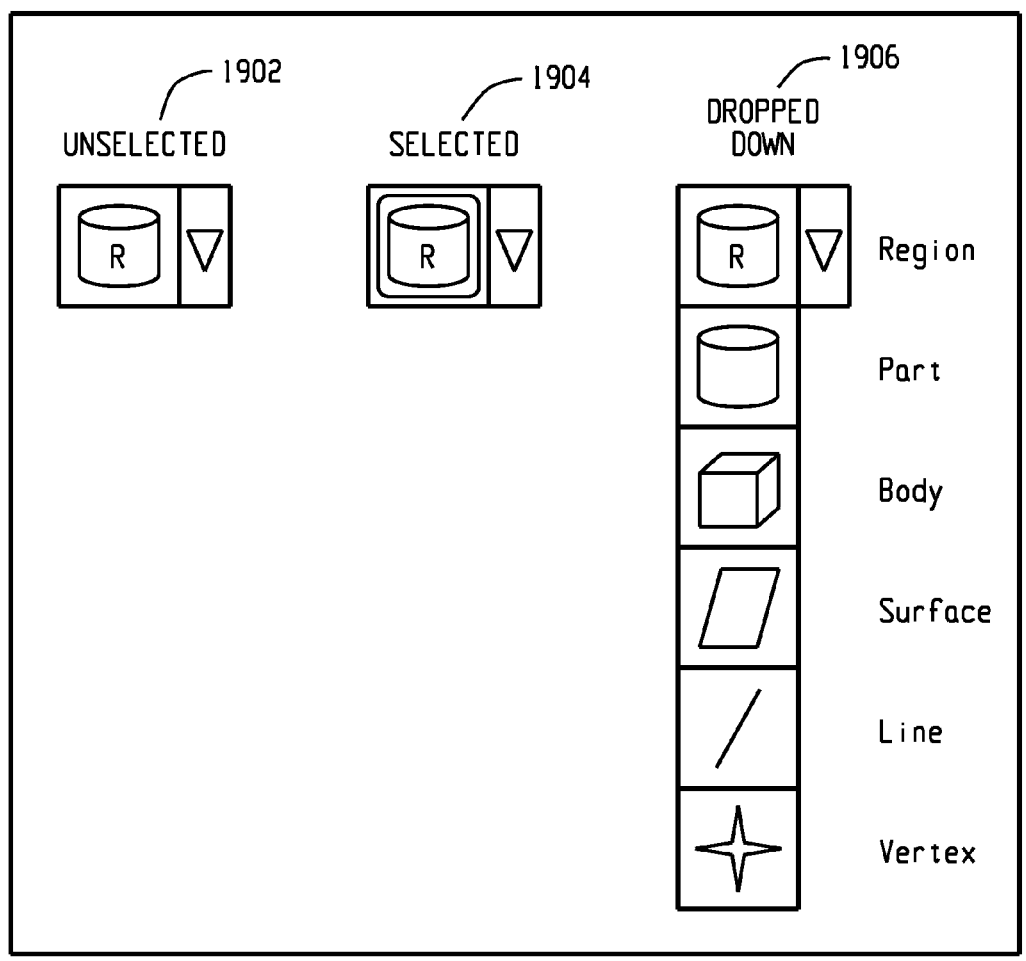
FIG. 19 is an alternative control for selecting model objects or portions of model objects for user-defined context definition.

FIG. 19 is an alternative control for selecting model objects or portions of model objects for user-defined context definition. In a first state 1902, the control indicates that no model object or portion thereof is currently selected. In a second state 1904, the control indicates that a model object (e.g., one of the sections 1802, 1804, 1806 of the exhaust manifold of FIG. 18) is selected. Based on that selection, a user-defined context could be defined. In a third state 1906, the control provides options for selecting a subset of a selected model object for selection (e.g., selection of the outside surface of one of the sections 1802, 1804, 1806 depicted in the simulation visualization of FIG. 18). A user-defined context could be defined based upon that sub-portion of the model object, such that all simulation objects associated with a simulation object associated with that sub-portion are identified by the user-defined container object as being associated with the user-defined context.

Figure 20:
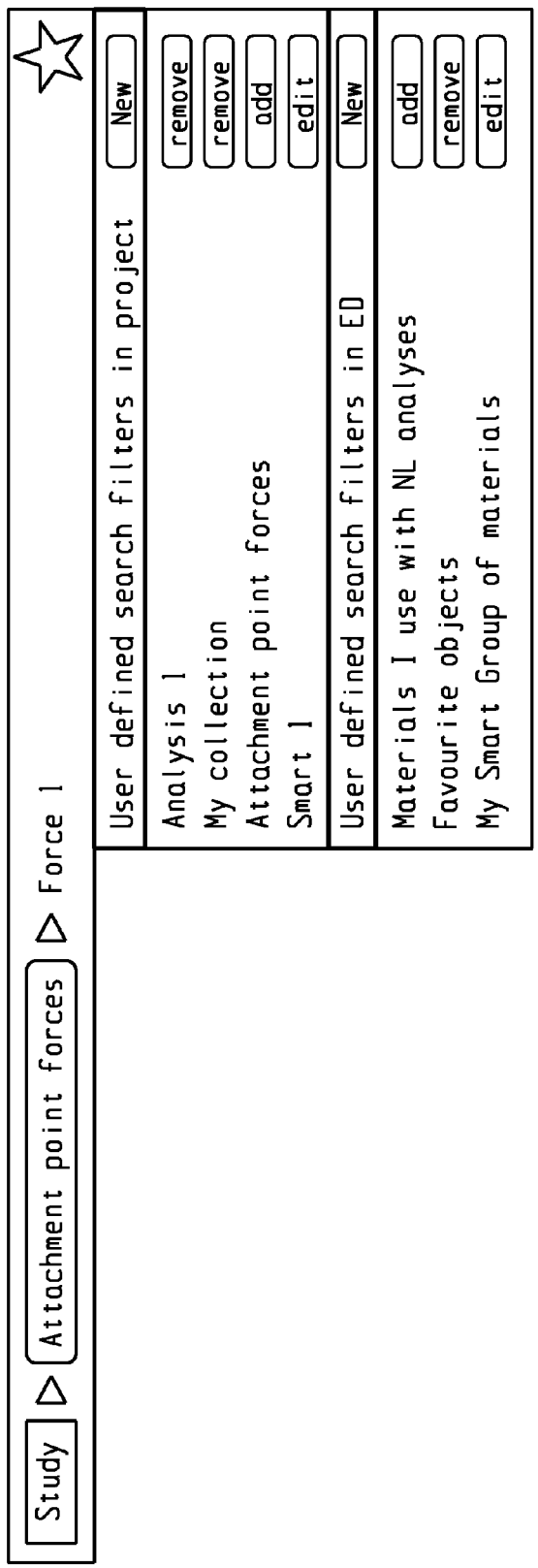
FIG. 20 depicts a favorites control for generating a user-defined search or accessing search results based on previously defined filters.

FIG. 20 depicts a favorites control for saving a user-defined search or accessing a search results based on previously saved filter sets. A search has been performed that identifies simulation objects having an attachment point type. Such a search can be saved in the favorites menu so that the search can be quickly repeated at a later time. Additionally, previously saved searches can be quickly accessed after having been previously saved in the favorites menu.

Figure 21:
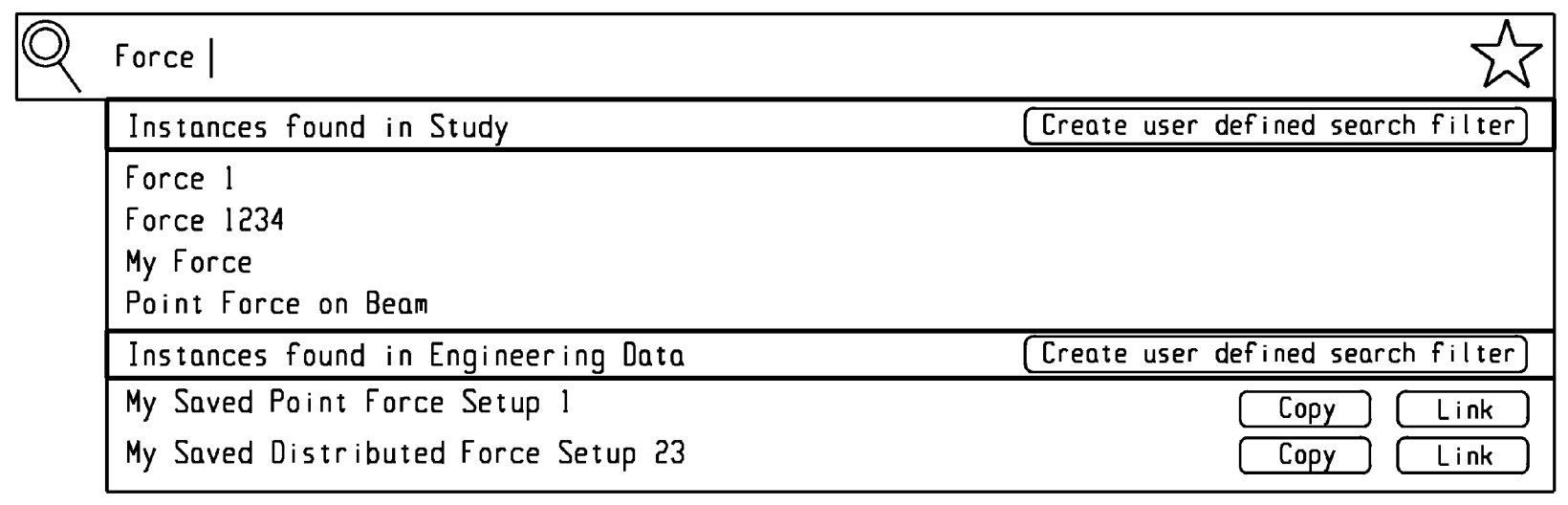

FIG. 21 depicts a text based search control. The text based search control searches object parameters of all simulation objects associated with a current simulation or all simulation objects associated with a current context (e.g., by parameter name or parameter value) to identify likely matches to text typed in a search box. Results from the text based search, or the text based search criteria can be utilized to define a user-defined context and associated user-defined container object (e.g., a container object that identifies all simulation objects returned by the current search, a container object that identifies the search text to be run when the user-defined context is selected in the future).

Figure 22:
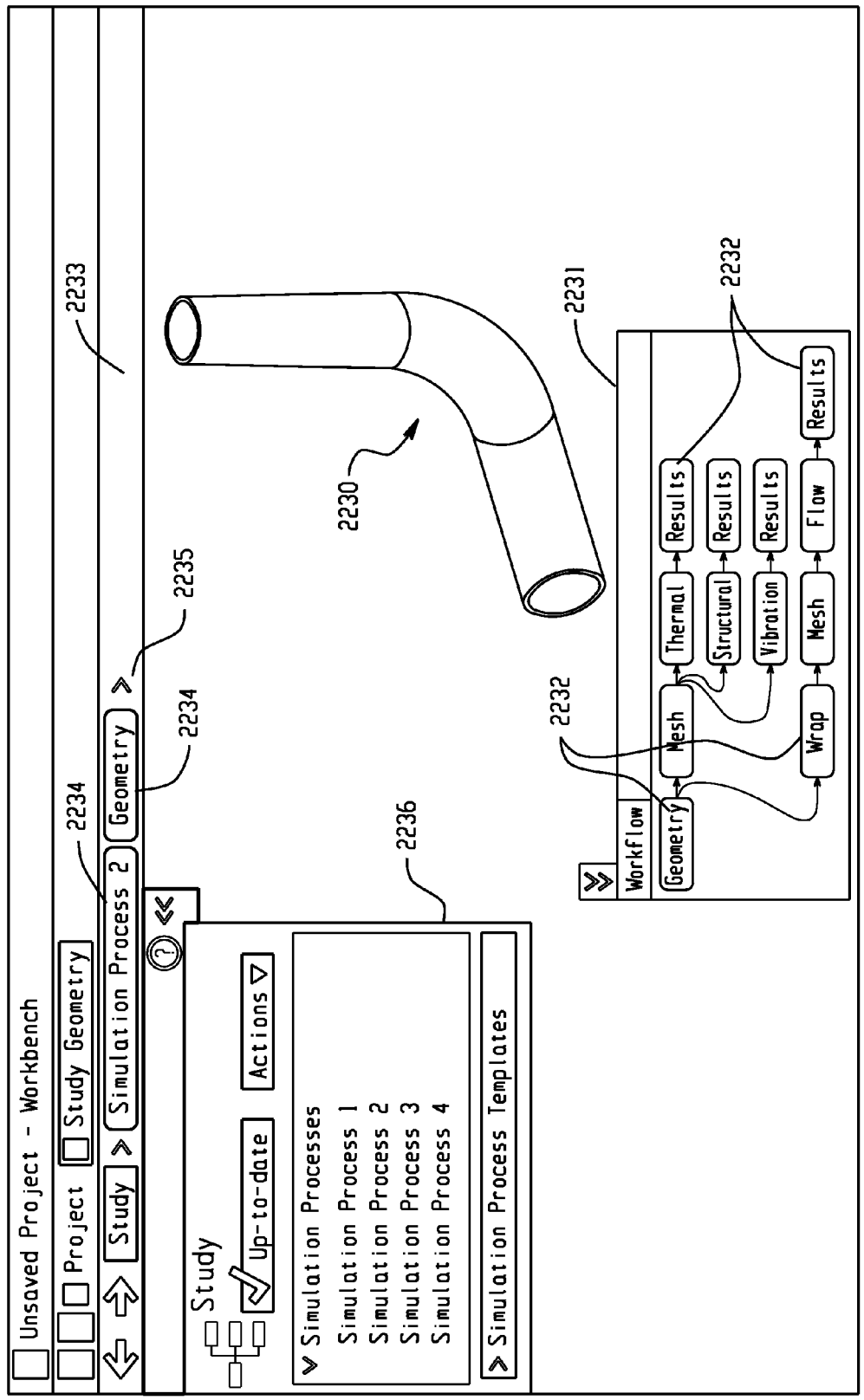
FIG. 22 depicts additional details of a first example simulation visualization.
Figure 23:
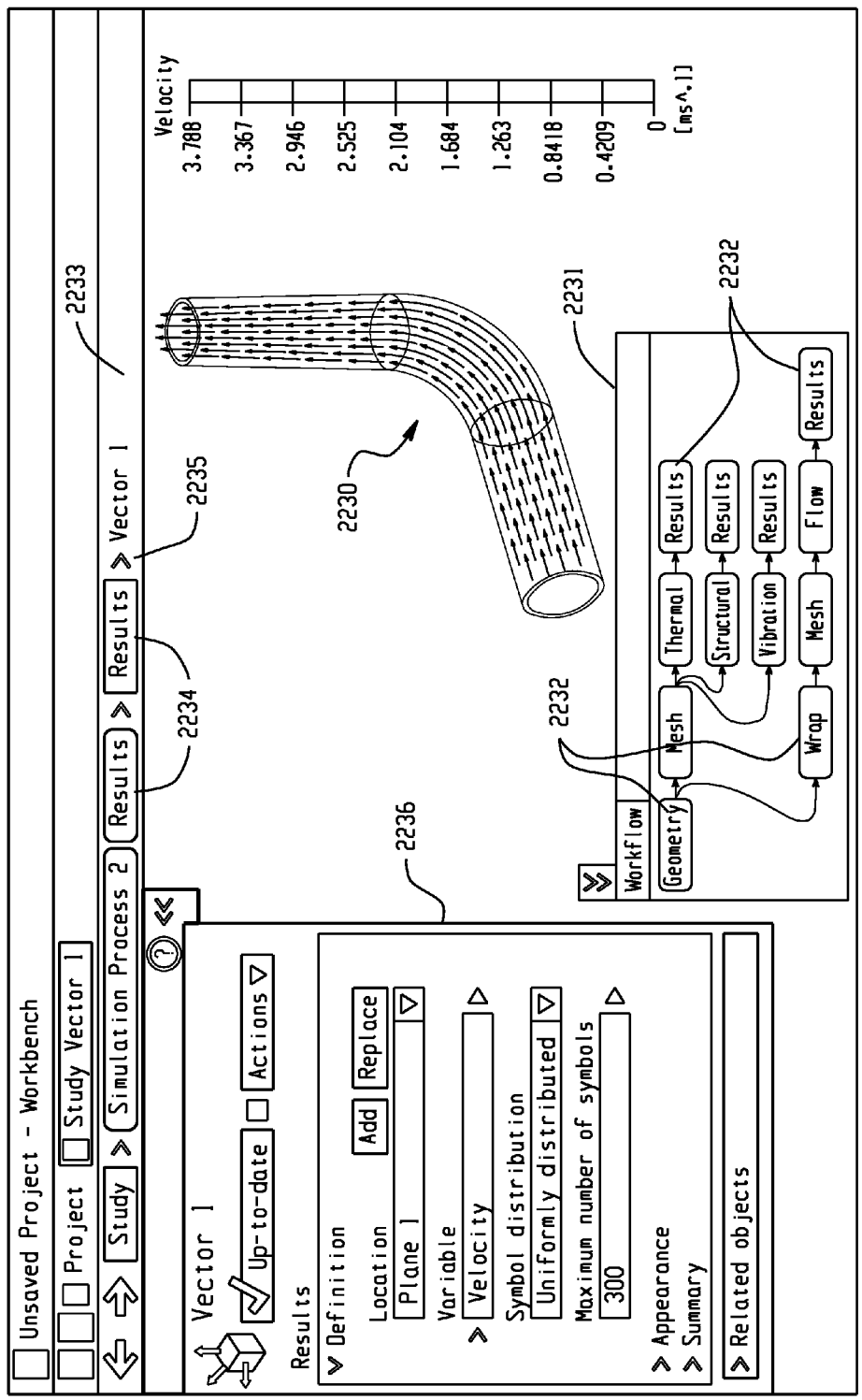
FIG. 23 depicts additional details of a second example simulation visualization.

FIGS. 22 and 23 depict additional details of example simulation visualizations. The example of FIG. 22 depicts model objects associated with a simulation, while FIG. 23 depicts results values (velocities) at different points within the simulation. The simulation visualization graphical user interfaces include a graphics view 2230 displaying the model geometry or results, as some examples, and a diagram in flowchart form 2231 showing the workflow of data, operations, or data and operations. The diagram in flowchart form 2231 includes a plurality of objects 2232 that are be connected with lines and arrows to show the flow of data and operations during the engineering analysis process. The diagram in flowchart form 2231 allows the user to visually interact, edit, and manipulate the engineering analysis process. Each of the objects may represent an operation or data that was used or produced during the engineering analysis. In some examples, operations represented by said objects include, for example, meshing, geometry meshing, wrapping, sewing, mesh connections, fracture, dimensional reduction, configuration management and combination, and data import but can be extended to any additional operation as necessary or desired. The objects may also represent engineering data, including import data and results data as some examples, but may be extended to any additional data or type of data as necessary or desired. The objects may also represent engineering simulation settings. The objects may be selected by the user via mouse click, touch on a touch screen, keyboard or other input or selection methods or devices to link to and display in further detail the operation or data on the user interface.

Additional embodiments of user interface may also include a search and select bar interface control 2233 that displays filters 2234 and selection buttons 2235 that can be selected to display a drop down menu 2236. In some examples, the filters 2234 can be locations, objects, categories and types used in the engineering simulation. In some examples, objects can be task objects, simulation settings objects, and engineering data objects. In some examples, categories can be methods of organizing types of simulation settings and engineering data, for example, boundary conditions and interfaces. In certain examples, types can include the data type that the task, simulation setting or engineering data objects provide to the simulation, for example, moments and point forces.

This application uses examples to illustrate the invention. The patentable scope of the invention includes other examples. For example, in one embodiment, filters can be applied in any order (e.g., context filter, category filter, type filter or context filter, type filter, category filter). In another example, changing a context filter will clear all downstream filters (e.g., a previously applied type filter).

It is claimed:

1. A computer-implemented system for providing a context-based search of simulation objects associated with an engineering simulation comprising a plurality of simulation tasks, the system comprising:
    a computer-readable medium configured for storage of objects and data records associated with the engineering simulation, wherein the engineering simulation emulates a real world physical behavior of a plurality of simulated objects in a computer simulated environment, including:
        a plurality of simulation objects, wherein each the plurality of simulation objects is representative of at least one of the plurality of simulated objects, further wherein a record associated with a respective simulation object includes an object parameter associated with the respective simulation object; and
        one or more container objects, wherein each of the one or more container objects comprises:
            a reference to a context of the engineering simulation; and
            a non-hierarchical list of at least one of the plurality of simulation objects that are associated with the context of the engineering simulation;
    a graphical user interface for display on a device and configured to cooperate with an input mechanism for selecting one or more controls, wherein the graphical user interface includes:
        a first control for selecting at least one context of the simulation, the first control capable of selecting multiple contexts simultaneously;
        a second control for selecting at least one object parameter; and
        a results display for displaying the result of a search; and one or more data processors configured to:
retrieve one or more contexts of the simulation from a data store, wherein each of the one or more contexts is associated with both (i) a physical interaction among at least two of the plurality of simulated physical objects and (ii) a result to be obtained from simulating the physical interaction;
associate the one or more contexts with the first control;
retrieve one or more object parameters from the data store, wherein each object parameter defines a physical property of at least one of the plurality of simulated physical objects;
associate the one or more object parameters with the second control;
receive a first context and a first object parameter responsive to selections made through the graphical user interface;
identify a first container object having a first reference to the first context;
access the first container object; and
search a first non-hierarchical list of the first container object for one or more first identified simulation objects each having an associated object parameter matching the first object parameter; and
providing identified simulation objects as the result to the graphical user interface for display in the results display, wherein the identified simulation objects include at least one of the first identified simulation objects.

2. The system of claim 1, wherein the one or more data processors are further configured to:
receive a second context from response to the selections made through the graphical interface, the second context differing from the first context;
identify a second container object having a second reference to the second context, the second container object differing from the first container object;
searching a second non-hierarchical list of the second container object for one or more second identified simulation objects each having an associated object parameter matching the first object parameter, wherein the identified simulation objects include only an intersection of the first identified objects and the second identified objects.

3. The system of claim 2, wherein the graphical user interface further includes a simulation visualization, wherein the simulation visualization depicts one or more simulation objects associated with the engineering simulation.

4. The system of claim 3, wherein at least one of the one or more container objects comprises a list of the one or more simulation objects associated with the depicted engineering simulation.

5. The system of claim 3, wherein a context referenced by at least one container objects is identified in the first control based upon a selection of the depicted simulation object in the simulation visualization.

6. The system of claim 1, wherein at least one of the container objects is user defined.

7. The system of claim 6, wherein the at least one of the container objects is created based on a user command, further wherein the at least one of the container objects is associated with one or more simulation objects that are results of a current search.

8. The system of claim 7, wherein the current search is performed based on a text entry of simulation object parameters.

9. The system of claim 1, wherein the simulation includes execution of a plurality of tasks, wherein a task is associated with a particular context of the simulation, wherein selection of the particular context using the first control results in the one or more data processors searching a first plurality of simulation objects included in a particular non-hierarchical list of a particular container object that references the particular context.

10. The system of claim 1, wherein at least one simulation object is associated with multiple distinct container objects within the same engineering simulation, wherein at least two distinct container objects include (i) different references to different contexts or (ii) different hierarchical lists.

11. The system of claim 1, wherein the first object parameter identifies a category associated with the simulation object.

12. The system of claim 11, wherein the category is a boundary condition category, an interface condition category, a size control category, a source category, a results category, a construction geometry category, a physical property category, or a monitor category.

13. The system of claim 1, wherein the first object parameter identifies a type associated with the simulation, wherein the type identifies a data type of data that one or more simulation objects provides as an input to an executing simulation.

14. The system of claim 13, wherein the type is a force, an inlet, an outlet, a physics region, a support, a contour, an isosurface, an edge sizing, or a reference frame.

15. The system of claim 1, wherein the second control is configured to display only categories or types associated with simulation objects that are listed in the non-hierarhical list of the identified container object data record.

16. The system of claim 15, wherein one or more object parameters associate to different categories or types when a different context is identified by the first control.

17. The system of claim 1, wherein one or more object parameters associate are a category object parameter or a type object parameter.

18. The system of claim 17, wherein a third control is configured for identification of a category object parameter when the second control identifies a type object parameter, and wherein the third control is configured for identification of a type object parameter when the second control identifies a category object parameter.

19. The computer-implemented system of claim 1, wherein the first non-hierarchical list of the first container object comprising a reference to the first context is updated when a new simulation object is associated with the first context.

20. The system of claim 1, wherein two contexts are identified via the first control, wherein the data processors are configured to identify one or more container object data records that have references to both of the two contexts.

21. The system of claim 1, wherein a first context of the one or more selected contexts is associated with a particular simulation task, and wherein a second context of the one or more selected contexts is associated with a geometry or a component of the simulation.

22. The computer-implemented method of claim 1, wherein (i) the physical interaction includes at least one of a boundary condition, an interface condition, a combustion, or an applied force; and (ii) the result to be obtained is a deformation, a pressure, a velocity, a frequency, or a temperature.

23. The system of claim 1, wherein the engineering simulation emulates a real world physical behavior of a physical system over time.

24. The system of claim 1, wherein the object parameter comprises at least one of a pressure, a temperature, a velocity, a vibration frequency, a size, or a force applied to a point on a simulation object.

25. A computer-implemented method of providing a context-based search of simulation objects associated with an engineering simulation comprising a plurality of simulation tasks, the method comprising:
  accessing a computer-readable medium configured for storage of objects and data records associated with the engineering simulation, wherein the engineering simulation emulates a real world physical behavior of a plurality of simulated objects in a virtual computer environment, including:
    a plurality of simulation objects, wherein each the plurality of simulation objects is representative of at least one of the plurality of simulated objects, further wherein a record associated with a respective simulation object includes an object parameter associated with the respective simulation object; and
    one or more container object data records, wherein each of the one or more container object data records comprises:
      a reference to a context of the engineering simulation; and
      a non-hierarchical list of at least one of the plurality of simulation objects that are associated with the context of the engineering simulation;
  providing a graphical user interface for display on a device and configured to cooperate with an input mechanism for selecting one or more controls, wherein the graphical user interface includes:
    a first control for selecting at least one context of the simulation, the first control capable of selecting multiple contexts simultaneously;
    a second control for selecting at least one object parameter; and
    a results display for displaying the result of a search; and
  retrieving one or more contexts of the simulation from a data store, wherein each of the one or more contexts is associated with both (i) a physical interaction between at least two of the plurality of simulated physical objects and (ii) a result to be obtained from simulating the physical interaction;
  associating the one or more contexts with the first control;
  retrieving one or more object parameters from the data store, wherein each object parameter defines a physical property of at least one of the plurality of simulated physical objects;
  associating the one or more object parameters with the second control;
  receiving a first context and a first object parameter responsive to selections made through the graphical user interface;
  identifying a first container object data record having a first reference to the first context;
  accessing the first container object data record; and
  searching a first non-hierarchical list of the first container object data record for one or more first identified simulation objects each having an associated object parameter matching the first object parameter; and
  providing identified simulation objects as the result to the graphical user interface for display in the results display, wherein the identified simulation objects include at least one of the first identified simulation objects.

26. A non-transitory computer-readable medium encoded with instructions for commanding one or more data processors to execute steps for providing a context-based search of simulation objects associated with an engineering simulation, the steps comprising:
  accessing a computer-readable medium configured for storage of objects and data records associated with the engineering simulation, wherein the engineering simulation emulates a real world physical behavior of a plurality of simulated objects in a virtual computer environment, including:
    a plurality of simulation objects, wherein each the plurality of simulation objects is representative of at least one of the plurality of simulated objects, further wherein a record associated with a respective simulation object includes an object parameter associated with the respective simulation object; and
    one or more container object data records, wherein each of the one or more container object data records comprises:
      a reference to a context of the engineering simulation; and
      a non-hierarchical list of at least one of the plurality of simulation objects that are associated with the context of the engineering simulation;
  providing a graphical user interface for display on a device and configured to cooperate with an input mechanism for selecting one or more controls, wherein the graphical user interface includes:
    a first control for selecting at least one context of the simulation, the first control capable of selecting multiple contexts simultaneously;
    a second control for selecting at least one object parameter; and
    a results display for displaying the result of a search; and
  retrieving one or more contexts of the simulation from a data store, wherein each of the one or more contexts is associated with both (i) a physical interaction between at least two of the plurality of simulated physical objects and (ii) a result to be obtained from simulating the physical interaction;
  associating the one or more contexts with the first control;
  retrieving one or more object parameters from the data store, wherein each object parameter defines a physical property of at least one of the plurality of simulated physical objects;
  associating the one or more object parameters with the second control;
  receiving a first context and a first object parameter responsive to selections made through the graphical user interface;
  identifying a first container object data record having a first reference to the first context;
  accessing the first container object data record; and
  searching a first non-hierarchical list of the first container object data record for one or more first identified simulation objects each having an associated object parameter matching the first object parameter; and
  providing identified simulation objects as the result to the graphical user interface for display in the results display, wherein the identified simulation objects include at least one of the first identified simulation objects.

* * * * *